(12) United States Patent
Drake, Jr.

(10) Patent No.: US 10,744,579 B2
(45) Date of Patent: Aug. 18, 2020

(54) CLAMPING APPARATUS

(71) Applicant: Robert Bosch Tool Corporation, Broadview, IL (US)

(72) Inventor: John H Drake, Jr., Arlington Heights, IL (US)

(73) Assignee: Robert Bosch GmbH, Stuttgart (DE)

( * ) Notice: Subject to any disclaimer, the term of this patent is extended or adjusted under 35 U.S.C. 154(b) by 840 days.

(21) Appl. No.: 15/151,353

(22) Filed: May 10, 2016

(65) Prior Publication Data

US 2017/0291235 A1    Oct. 12, 2017

Related U.S. Application Data

(63) Continuation-in-part of application No. 15/095,983, filed on Apr. 11, 2016, now abandoned.

(51) Int. Cl.

| | |
|---|---|
| B23D 47/04 | (2006.01) |
| B25B 5/06 | (2006.01) |
| B25B 5/16 | (2006.01) |
| B25B 5/14 | (2006.01) |
| B25B 5/12 | (2006.01) |

(52) U.S. Cl.
CPC .............. B23D 47/04 (2013.01); B25B 5/068 (2013.01); B25B 5/127 (2013.01); B25B 5/145 (2013.01); B25B 5/163 (2013.01)

(58) Field of Classification Search
CPC ......... B23D 47/04; B25B 5/068; B25B 5/127; B25B 5/145; B25B 5/163
See application file for complete search history.

(56) References Cited

U.S. PATENT DOCUMENTS

| | | | | |
|---|---|---|---|---|
| 2,271,532 A | * | 2/1942 | Allmendinger | B23G 1/48 408/97 |
| 2,350,034 A | * | 5/1944 | Herrington | B25B 5/12 269/164 |
| 2,430,900 A | | 11/1947 | Wetzler | |
| 4,367,668 A | * | 1/1983 | Jensen | B27B 25/10 83/409 |
| 4,926,722 A | | 5/1990 | Sorenson et al. | |
| 5,009,134 A | | 4/1991 | Sorensen et al. | |
| (Continued) | | | | |

FOREIGN PATENT DOCUMENTS

DE      102012212058 A1    1/2014

OTHER PUBLICATIONS

International Search Report for PCT/EP2017/057821, dated Jun. 22, 2017.

*Primary Examiner* — David P Bryant
*Assistant Examiner* — Nirvana Deonauth

(57) ABSTRACT

A clamping apparatus includes a shaft; a base body that is adjustable to different positions, e.g., heights, along the shaft; a clamping leg arranged to pivot into a first clamping position and a second clamping position; an arm that includes, and extends between, a first end portion connected to the base body and a second end portion connected to the clamping leg; and a handle configured to be moved (a) into a first position that locks the position of the base body relative to the shaft and provides a clamping force to the clamping leg, and (b) into a second position in which the base body is free to be shifted into different positions along the shaft, where moving the handle into the second position releases the clamping force.

21 Claims, 16 Drawing Sheets

(56) References Cited

U.S. PATENT DOCUMENTS

| | | | |
|---|---|---|---|
| 5,022,137 | A | 6/1991 | Sorensen et al. |
| D320,919 | S | 10/1991 | Sorensen |
| 5,064,178 | A * | 11/1991 | Nimtz ............... B25B 1/103 269/147 |
| 5,730,434 | A | 3/1998 | Schoene et al. |
| 5,921,535 | A | 7/1999 | Lutz, III |
| 6,412,767 | B1 | 7/2002 | Beckmann et al. |
| 6,543,323 | B2 * | 4/2003 | Hayashizaki ....... B23D 45/044 269/240 |
| 7,721,632 | B2 * | 5/2010 | Chen ................. B23D 47/04 269/164 |
| 2008/0086852 | A1 | 4/2008 | Hall, Jr. et al. |
| 2011/0107892 | A1 * | 5/2011 | Imamura ............ B23D 45/048 83/471.3 |
| 2012/0055309 | A1 | 3/2012 | Chen |
| 2013/0055872 | A1 | 3/2013 | Menze |
| 2014/0339753 | A1 * | 11/2014 | Fukui ................. B25B 5/122 269/228 |

* cited by examiner

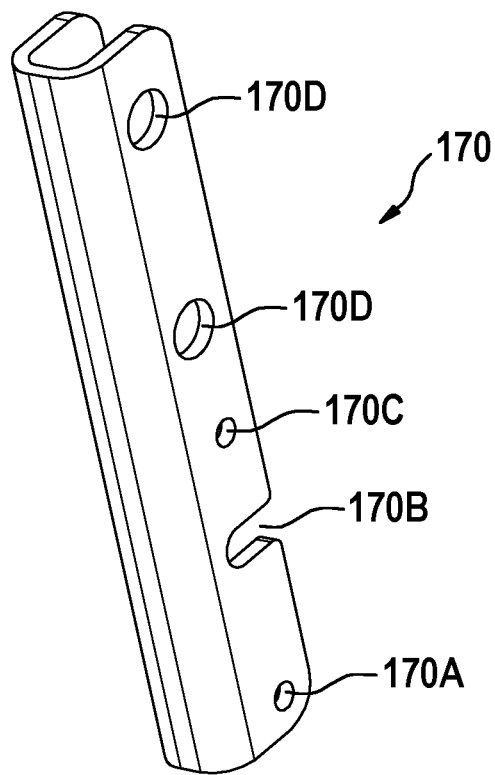
Fig. 5
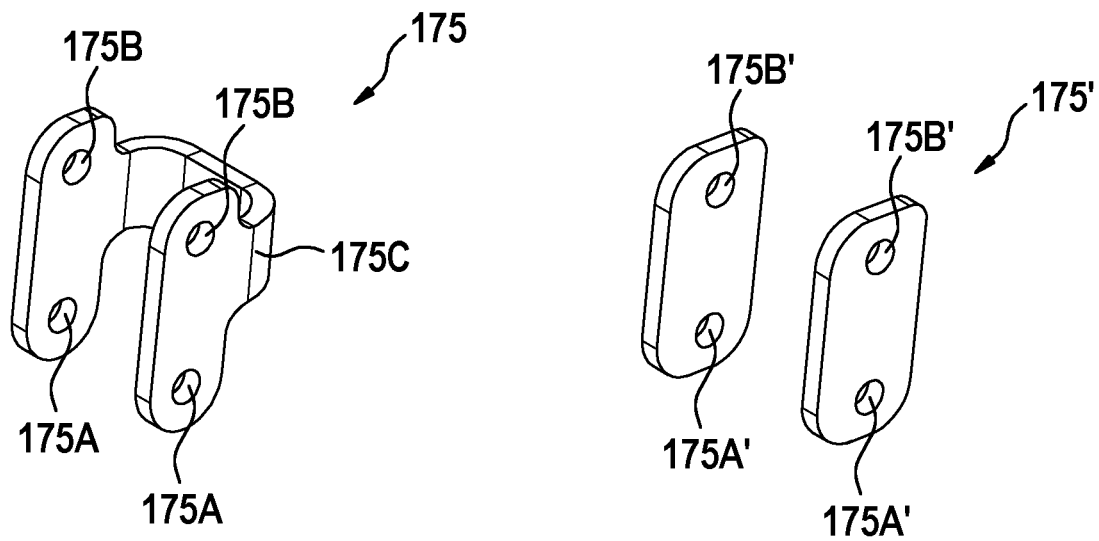
Fig. 6A
Fig. 6B

CLAMPING APPARATUS

CROSS-REFERENCE TO RELATED APPLICATIONS

This application is a continuation-in-part application of U.S. patent application Ser. No. 15/095,983, filed Apr. 11, 2016, the contents of which are incorporated herein by reference in its entirety.

FIELD OF THE INVENTION

This invention disclosure relates generally to clamping apparatuses.

BACKGROUND

Saw assemblies, such as miter saw assemblies, typically use clamps to hold workpieces in fixed positions. For example, these clamps typically comprise lead screw type mechanisms that are configured to adjust to workpieces of different thicknesses. However, it may take a significant amount of time and effort to perform such adjustments in relation to the workpieces, as the movement of the lead screw type mechanism occurs along threads, requiring repeated twisting motions for adjusting a height of the clamp to accommodate respective workpiece thicknesses.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

In an example embodiment, a clamping apparatus includes a shaft; a base body that is adjustable to different positions, e.g., heights, along the shaft; a clamping leg arranged to pivot into a first clamping position and a second clamping position; and an arm that includes, and extends between, a first end portion connected to the base body and a second end portion connected to the clamping leg.

In an example embodiment, a clamping apparatus includes a shaft; a base body that is adjustable to different positions, e.g., heights, along the shaft; a clamping leg; a handle configured to be moved (a) into a first position that locks the position of the base body relative to the shaft and provides a clamping force to the clamping leg, and (b) into a second position in which the base body is free to be shifted into different positions along the shaft, where moving the handle into the second position releases the clamping force; and an arm that includes, and extends between, a first end portion proximal to the base body and a second end portion connected to the clamping leg.

In an example embodiment, a power tool apparatus includes a power tool and a clamping apparatus for clamping a workpiece into a position to be acted upon by the power tool, where the clamping apparatus includes a shaft; a base body that is adjustable to different positions, e.g., heights along the shaft; a clamping leg arranged to pivot into a first clamping position and a second clamping position; and an arm that includes, and extends between, a first end portion connected to the base body and a second end portion connected to the clamping leg.

These and other features, aspects, and advantages of the present invention are further clarified by the following detailed description of certain exemplary embodiments in view of the accompanying drawings throughout which like characters represent like parts.

BRIEF DESCRIPTION OF THE DRAWINGS

FIG. 5 is an enlarged view of a handle shown in FIG. 2, according to an example embodiment of the present invention.

FIG. 6A is an enlarged view of a link shown in FIG. 2, according to an example embodiment of the present invention.

FIG. 6B is an enlarged view of a link according to an alternative example embodiment of the present invention.

DETAILED DESCRIPTION

Figure 1:
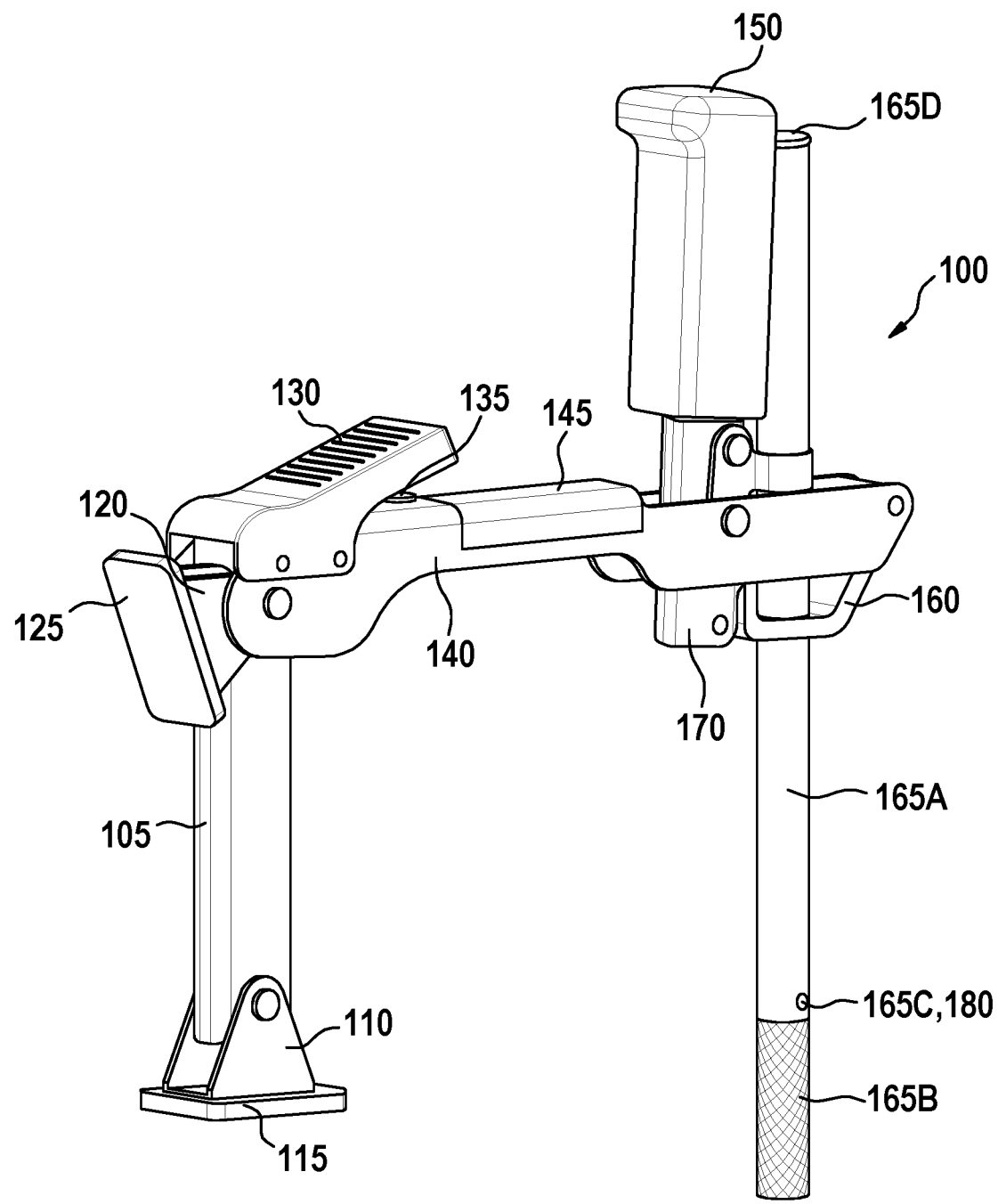
FIG. 1 is a perspective view of a clamping apparatus according to an example embodiment of the present invention.

FIG. 1 illustrates a perspective view of a clamping apparatus 100, according to an example embodiment of the present invention. The illustrated clamping apparatus 100 is structured to hold in a fixed position at least one object, such as a workpiece W of any suitable material, non-limiting examples of which include wood, plastic, stone, tile, or the like.

In an example embodiment, the clamping apparatus 100 is a standalone apparatus provided with a frame or base (not shown) of rigid material, which is configured to hold and support the clamping apparatus 100. The illustrated clamping apparatus 100 includes a shaft 165 via which the clamping apparatus 100 can be connected to the frame or base by various mechanical structures, mechanical connectors, mechanical fasteners, or any combination thereof.

Alternatively, in an example embodiment, the clamping apparatus 100 is configured to operate in conjunction with another apparatus, such as a power tool apparatus, e.g., a saw apparatus 200, such as a miter saw apparatus or stone saw apparatus, as shown in FIGS. 12A-14B. In this example, the shaft 165 of the clamping apparatus 100 is configured to connect to a base of the saw apparatus 200 by any suitable mechanical structures, connectors, or fasteners, or any combination thereof. As an example, the shaft 165 of the clamping apparatus 100 is configured to be securely set within a through-hole, cavity, or recess within a base of the saw apparatus 200. Alternatively, the shaft 165 or a portion thereof, e.g., the non-slip section 165B discussed below, is hollow, forming a female component into which a male component of the base of the saw apparatus 200 can be inserted. The latter alternative is particularly advantageous in the case of a wet stone saw, so that water does not collect within the base of the saw apparatus 200.

In each of the abovementioned standalone or integrated configurations, the clamping apparatus 100 includes at least a shaft 165 and a clamping mechanism. For example, in an example embodiment, the shaft 165 comprises a rigid material by which the shaft 165 is configured to support the clamping mechanism. For example, the rigid material can include a metal, an alloy, a high-strength plastic, or any other suitable composition with sufficient strength and stiffness, non-limiting examples of which include steel and aluminum.

The shaft 165 is an elongated member that extends between a first end portion thereof and an opposite second end portion thereof. In an example embodiment, the shaft 165 includes at the first end portion a non-slip section 165B configured to provide friction to thereby reduce or prevent slippage when a clamping force 800 (see FIGS. 8B, 9A, and 9B) is applied. For example, in an example embodiment, the non-slip section 165B includes knurls or the like. The non-slip section 165B is securely connected to the base of the clamping apparatus 100 itself or to the base of another apparatus, such as the saw apparatus 200. As one example, the non-slip section 165B of the shaft 165 is set within a corresponding through-hole, recess, or cavity of the base.

In an example embodiment, the first end portion of the shaft 165 includes a first stopper 165C that includes, for example, a knob, a shoulder, a head of a mechanical fastener, an abutment surface, or the like. The first stopper 165C can be integral with or separate from the shaft 165. The first stopper 165C is configured to maintain the clamping mechanism on the shaft 165, for example, by preventing a base body 160 of the clamping mechanism from sliding off of the first end portion of the shaft 165, e.g., when the shaft 165 is not attached to the base of the saw apparatus 200.

In an example embodiment, the second end portion of the shaft 165 includes a second stopper 165D that includes, for example, a knob, a shoulder, a head of a mechanical fastener, an abutment surface, or the like. The second stopper 165D can be integral with or separate from the shaft 165. The second stopper 165D is configured to maintain the clamping mechanism on the shaft 165, for example, by preventing the base body 160 of the clamping mechanism from sliding off of the second end portion of the shaft 165.

In an example embodiment, such as that shown in FIG. 1, between the first end portion and the second end portion, the shaft 165 includes a portion 165A, the surface of which is relatively smooth and non-threaded, to allow a substantially unhindered sliding action of the base body 160 relative to the shaft 165 without any substantial friction preventing the sliding action. In an alternative example embodiment, the base body 160 is fixed to the shaft 165, and the position, e.g., height, of the clamping mechanism is instead changeable via another mechanical mechanism, such as telescoping rods of the shaft 165 by which a length of the shaft 165 can be varied.

In an example embodiment, the shaft 165 optionally includes an anti-rotation mechanism that prevents the shaft 165 from rotating or spinning. For instance, according to an example embodiment shown in FIGS. 8A and 8B, an anti-rotation mechanism is an elongated groove 155 in the surface of the shaft 165, where the elongated groove 155 is configured to receive a pin or other mechanical structure, which can shift longitudinally within the elongated groove 155 but cannot shift rotationally around the shaft 165. In other words, the anti-rotation mechanism is configured to enable the clamping apparatus 100 to maintain its rotational position and setting.

Figure 2:
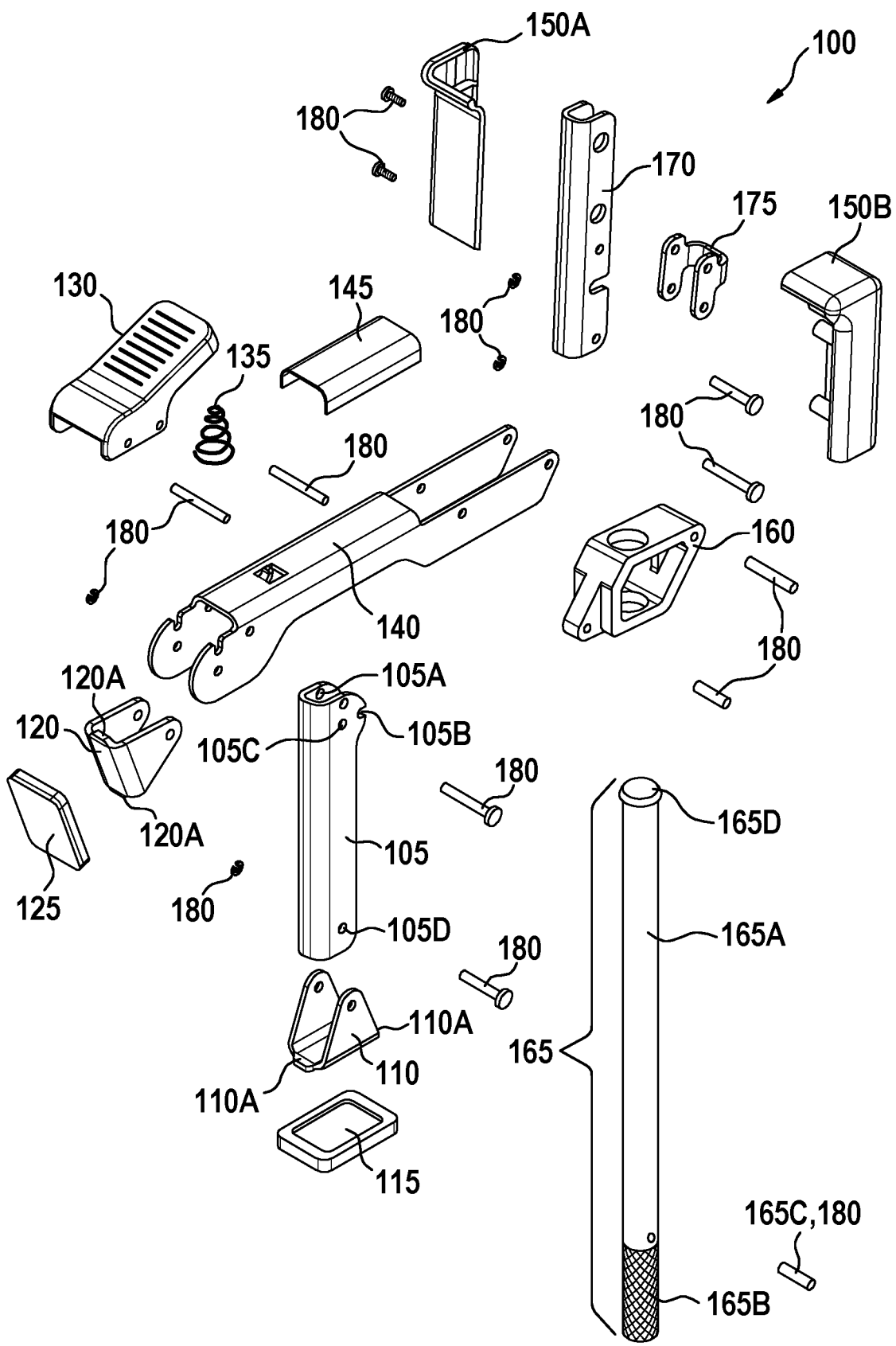
FIG. 2 is an exploded view of the clamping apparatus of FIG. 1, according to an example embodiment of the present invention.

FIG. 2 provides an exploded view of the clamping apparatus 100 according to an example embodiment of the present invention. Referring to FIG. 2, in an example embodiment, the clamping mechanism of the clamping apparatus 100 includes at least the base body 160, an arm 140, a handle 170, a link 175, a leg 105, a clamping foot 110, and a clamping foot 120. Also, in this example embodiment, the clamping mechanism further includes a release lever 130 and associated components by which to adjust the leg 105 between first and second positions. Some components, such as clamping foot 120 and release lever 130, although illustrated in FIG. 2, can be omitted from the clamping mechanism in other alternative embodiments (such as the embodiments shown in FIGS. 10A-11B).

In an example embodiment, the clamping mechanism is configured to be adjustable between various positions, e.g., heights, relative to the base of the clamping apparatus 100 or the base of another apparatus (e.g., a saw apparatus 200). In an example embodiment, the height adjustment of the clamping apparatus 100 occurs by a sliding action. For example, in an example embodiment, the height adjustment is performed by sliding the base body 160 to a desired position along the shaft 165. In such configurations, the clamping apparatus 100 includes a height adjustment locking mechanism. In an example embodiment, the base body 160 is configured to be tilted relative to the shaft 165 when the handle 170 is shifted into a locking position in which the clamping force 800 is applied, such that an interior edge of the base body 160 abuts an outer edge of the shaft 165, thereby preventing a relative sliding movement between the base body 160 and the shaft 165.

In another example embodiment, the height adjustment of the clamping mechanism is performed by utilizing another mechanical mechanism, such as telescoping rods of the shaft 165. In such configurations, the sliding height adjustment is performed by the telescoping rods telescoping the shaft 165 to different lengths, which can be locked by a suitable locking mechanism, while a position of the base body 160 relative to the shaft 165 is fixed.

In each of these cases, the sliding or telescoping mechanism relative to or of the shaft 165 provides for adjusting the height of the clamping mechanism in a significantly advantageous manner compared to conventional apparatuses, for example, with a decreased height adjustment time, decreased height adjustment effort, and an increase in user productivity, e.g., in comparison to a clamp with a lead screw type mechanism.

The exploded view of FIG. 2 illustrates the shaft 165, as well as the clamping mechanism, in greater detail. For example, as shown, the clamping mechanism includes the base body 160. In an example embodiment, the base body 160 comprises a rigid material, such as a metal, an alloy, a high-strength plastic, or any suitable composition of sufficient strength and stiffness, non-limiting examples of which include steel and aluminum.

Figure 3:
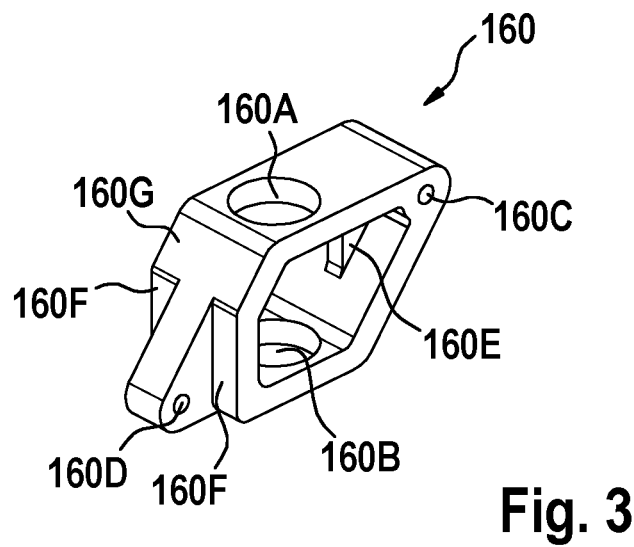
FIG. 3 is an enlarged view of a base body shown in FIG. 2, according to an example embodiment of the present invention.

FIG. 3 provides an enlarged view of the base body 160 of FIG. 2. FIG. 1 shows the base body slidably connected to the shaft 165. More specifically, in the illustrated embodiment, the base body 160 includes an upper bore 160A and a lower bore 160B, which are configured to receive the shaft 165, so that the base body 160 can slide along at least a portion of the shaft 165, for example between stoppers, such as the first stopper 165C and the second stopper 165D, thereby enabling the clamping apparatus 100 to accommodate workpieces W of different thicknesses.

Figure 7A:
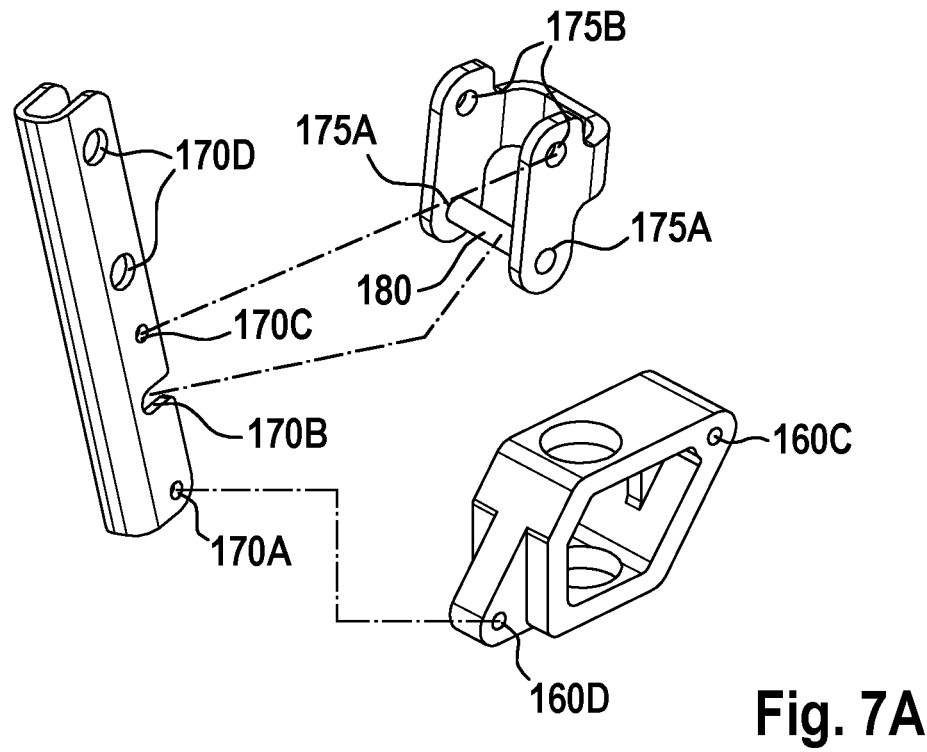
FIG. 7A is a perspective view of the handle, the link, and the base body of FIG. 2, according to an example embodiment of the present invention.

In an example embodiment, the base body 160 includes a handle connection portion 160D via which the base body 160 is connected to the handle 170. In an example embodiment, the handle connection portion 160D includes a structure, such as tab or a tab-like portion, which is configured to support a connection to handle 170. As shown in FIG. 7A, the tab or tab-like portion is shaped to support a connection to the bottom portion of the handle 170. In an example embodiment, the tab or tab-like portion is positioned at a lower portion of the base body 160, the portion facing toward the second end of the arm 140. In an example embodiment, the handle connection portion 160D includes at least one through-hole, which is configured to receive at least one mechanical fastener 180, which connects the handle 170 to the base body 160. According to each of the exemplary embodiments disclosed herein, a mechanical fastener 180 refers to any suitable hardware device that joins, affixes, or assists in the joining of at least two components to each other, non-limiting examples of which include screws, clips, rivets, bolts, pins, rods, nuts, washers, and other hardware devices.

In an example embodiment, the base body 160 includes at least one abutment surface 160F. The abutment surface 160F is configured to prevent the handle 170 from rotating to a position, which is too far beyond its over-center lock point, at which the locking and clamping forces will be released, i.e., the abutment surface 160F is configured to maintain the locking and clamping forces. For instance, in an example embodiment, edge portions of the handle 170 are configured to abut against the at least one abutment surface 160F to prevent the handle 170 from further rotation beyond that point. Additionally, in an example embodiment, the abutment surface 160F is configured to prevent the handle 170 from colliding with the shaft 165.

For example, as shown in the example embodiment of FIG. 3, the handle connection portion 160D is positioned in the middle portion of the abutment surface 160F. Also, as shown, the handle connection portion 160D protrudes outward from the abutment surface 160F. In this example, the abutment surface 160F is positioned an appropriate distance away from the handle connection portion 160D such that the handle 170 is enabled to pivot into a released state (e.g., a non-clamping state and/or unlocked state) and also into an over-center lock point (e.g., a clamping and/or locking state).

Figure 4:
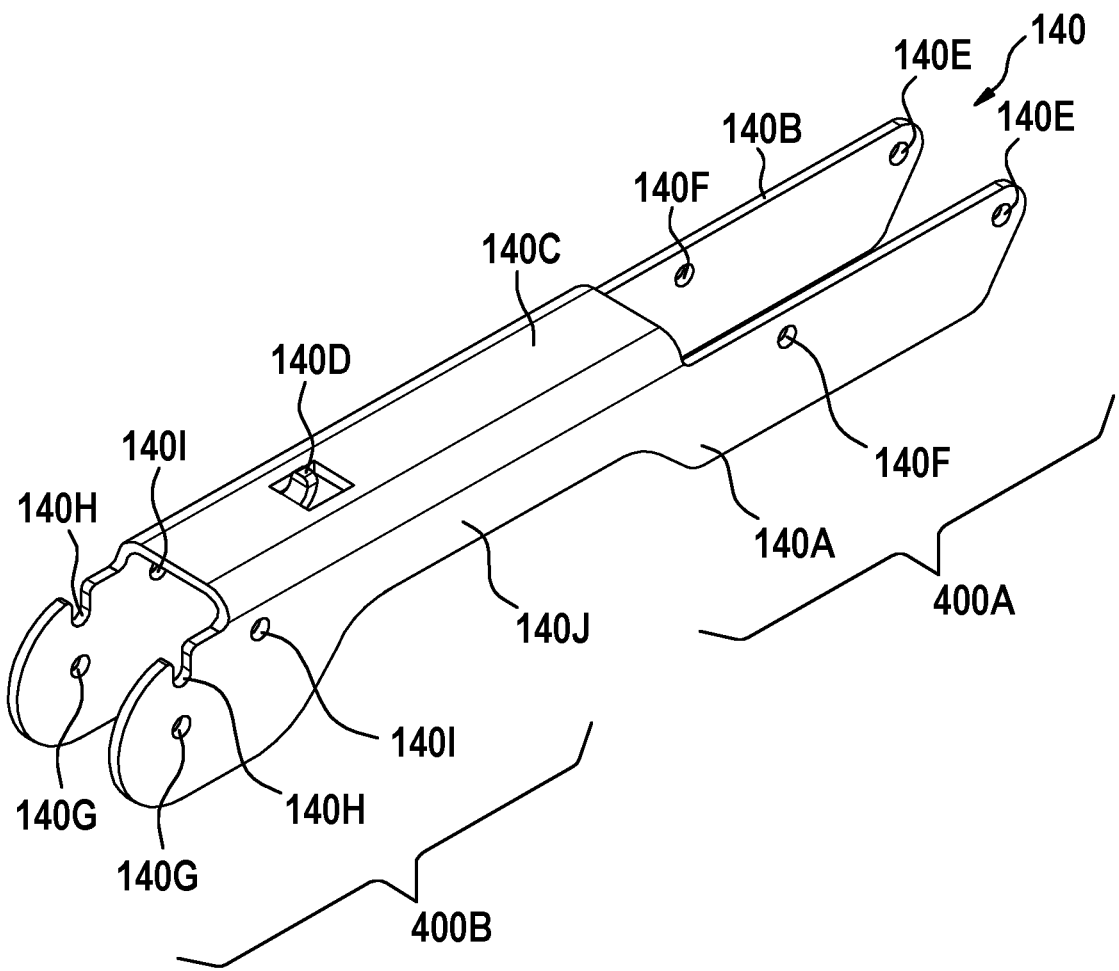
FIG. 4 is an enlarged view of an arm shown in FIG. 2 according to an example embodiment of the present invention.

In an example embodiment, the base body 160 is connected to the arm 140 at a first end portion 400A of the arm 140, the base body 160 including an arm connection portion 160C that connects to a base body connection portion 140E of the arm 140 as shown in FIG. 4, which connection allows for the base body 160 to pivot relative to the arm 140, for example vertically upwards to generate a downward clamping force 800. In an example embodiment, the arm connection portion 160C is at an upper and outer portion of the base body 160, diagonally across from handle connection portion 160D. As shown in FIG. 3, sides of the base body 160 that are in planes approximately parallel to a direction of longitudinal extension of the shaft 165 and approximately parallel to the direction of longitudinal extension of the arm 140 are substantially diamond shaped. In this regard, for example, an upper surface of the base body 160 is shifted more in a direction towards a first end of the arm 140 (in the first end portion 400A) than the lower surface of the base body 160. In an example embodiment, the arm connection portion 160C in the upper portion of the base body 160 includes at least one through-hole, which is configured to receive at least one mechanical fastener 180 that is able to connect the arm 140 to the base body 160 in a manner that provides a pivot point about which the base body 160 is able to pivot relative to the arm 140. Additionally, the noted diamond shape provides the base body 160 with an angled surface 160G facing towards the second end of the arm 140, thereby providing sufficient clearance to allow the handle 170 to be pivoted about the mechanical fastener 180 connected to the handle connection portion 160D, towards the shaft 165, and into an over-center lock point (discussed below) generating the locking and clamping forces. In an example embodiment, the base body 160 includes an interior rib 160E with a triangular cross-section conforming to an interior angle of the diamond shape towards the first end of the arm 140, or other supporting structure, to strengthen base body 160, particularly to withstand the force applied to an upper portion of the handle 170 against the base body 160 when the handle is in the locking position.

FIG. 4 illustrates an enlarged view of the arm 140 according to an example embodiment of the present invention. The arm 140 extends towards its second end portion 400B, away from the base body 160, the handle 170, and the shaft 165. The arm 140 is configured to be any suitable length as long as it is able to provide the necessary functions, as discussed herein. In this regard, the arm 140 is configured to provide the necessary connections and linkage to at least the base body 160, the handle 170, and the extendable leg 105. In addition, in an example embodiment, the arm 140 is configured to connect to a release lever 130 for the extendable leg 105.

To provide proper support for these connections, in an example embodiment, the arm 140 comprises a rigid material, such as a metal, an alloy, a high-strength plastic, or any composition of sufficient strength and stiffness. In an example embodiment, the arm 140 is a stamped sheet of a metal material. Alternatively, the arm 140 can be formed by welding together a plurality of suitable parts.

As shown in FIG. 4, the arm 140 comprises a three-sided structural configuration such that the strength and rigidity of the structure is enhanced. The three-sided structural configuration includes a substantially U-shaped or substantially C-shaped cross-section. More specifically, in an example embodiment, the arm 140 includes a first side 140A, a second side 140B, and a top side 140C. In addition, this three-sided structural configuration of the arm 140 is configured to receive and house the extendable leg 105 when the extendable leg 105 is in its first position, as shown in FIGS. 9A, 10A, 11A, 12A, 12B, 13A, and 13B. In an example embodiment, in order to quickly access the extendable leg 105 when stored in the arm 140, each of the first side 140A and the second side 140B includes a recessed portion 140J that exposes the extendable leg 105 at the lower edges of each of at least one of the first and second sides 140A, 140B when the extendable leg 105 is housed in the arm 140 and in the first position, as shown in FIGS. 9A, 10A, 11A, 12A, 12B, 13A, and 13B.

In an example embodiment, the first side 140A and the second side 140B are parallel to each other and are each connected to each of the base body 160, the handle 170, the release lever 130, and the extendable leg 105. Meanwhile, the top side 140C is a bridge that connects the first side 140A and the second side 140B. In the example embodiment, the top side 140C is sized to provide support to at least release lever 130 and its spring 135 (FIGS. 1-2). In this regard, the top side 140C includes a spring retainer, which is structured to hold the spring 135 of the release lever 130 in its proper position. As one example, the spring retainer is a detent 140D, which comprises a cut and bent portion of the top side 140C of the arm 140.

Optionally, in an example embodiment, the top side 140C is also sized to accommodate a label 145. The label 145 may provide the user with warnings, instructions, advice, explanations, or other relevant messages. As one example, for instance, when the clamping apparatus 100 is used together with a saw apparatus 200, the label 145 is a warning sticker with the following message: "Before switching tool on, make a DRY-RUN to see that the clamp clears guard and head assembly. If it does not, then see the manual for further instructions."

According to an example embodiment, at the first end portion 400A, the first side 140A and the second side 140B are spaced sufficiently apart from each other to accommodate the base body 160 between the first side 140A and the second side 140B. Each of the first side 140A and the second side 140B includes a base body connection portion 140E at the first end portion 400A of the arm 140. The base body connection portion 140E includes at least one through-hole, which is configured to receive at least one mechanical fastener 180 that connects the arm connection portion 160C of the base body 160 to the arm 140. In this manner, the arm 140 is attached to the base body 160.

Figure 7B:
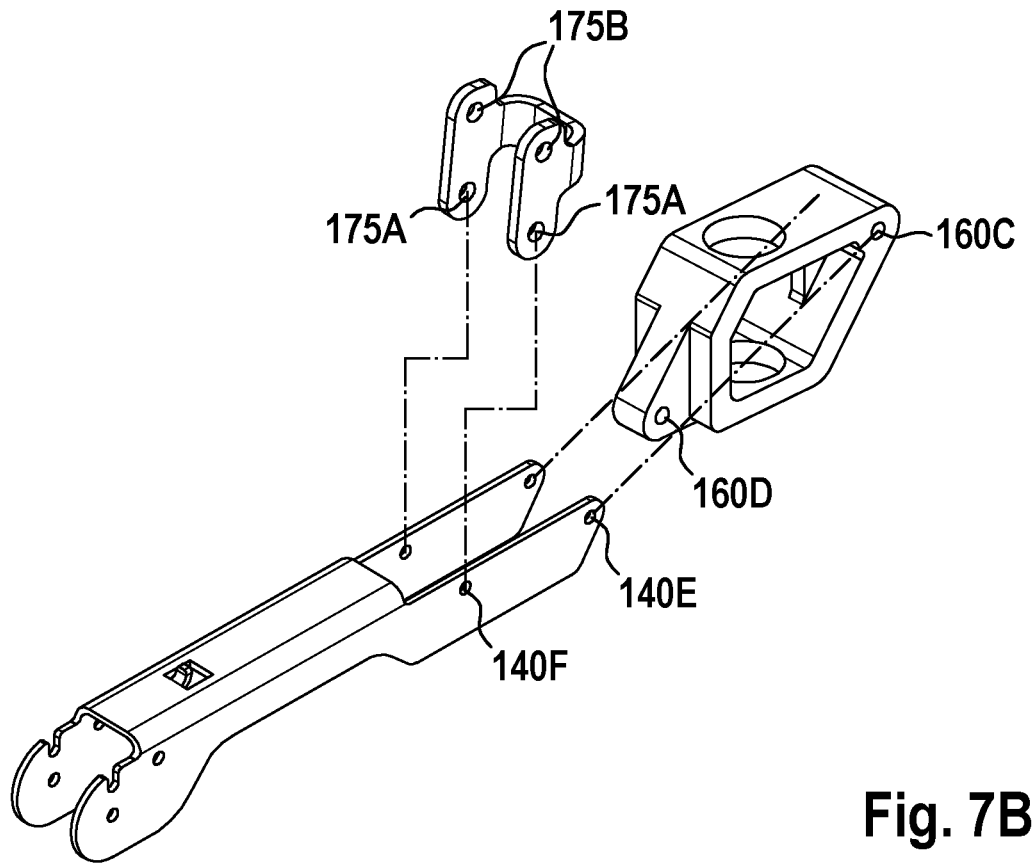
FIG. 7B is a perspective view of the link, the base body, and the arm of FIG. 2, according to an example embodiment of the present invention.

In an example embodiment, at the first end portion 400A of the arm 140, the spacing between the first side 140A and the second side 140B is sized to accommodate the handle 170. In an example embodiment, the arm 140 includes a link connection portion 140F that includes at least one through-hole that is configured to receive at least one mechanical fastener 180, which provides a pivotal connection between the link 175 and the arm 140 (FIG. 7B). In addition, this same mechanical fastener 180 can be received by at least one groove 170B in the handle 170, depending on the position of the handle 170. With this configuration, a lower portion of the handle 170 can be pivoted towards and away from the link 175. In this manner, the arm 140 provides a pivot point for the link 175 at the link connection portion 140F.

In an example embodiment, at a second end portion 400B of the arm 140, the spacing between the first side 140A and the second side 140B is sized to accommodate, between sides 140A and 140B, both the clamping foot 120 and the extendable leg 105. Also, in an example embodiment, the second end portion 400B of the arm 140 includes the pivot connection portion 140G. In an example embodiment, the pivot connection portion 140G includes at least one through-hole, which is configured to include at least one mechanical fastener 180 that enables the clamping foot 120 and the extendable leg 105 to perform a pivoting motion. The pivoting motion enables the clamping foot 120 to be properly positioned. In addition, the pivoting motion enables the extendable leg 105 to move from the first position, as shown in at least FIG. 9A, to the second position, as shown in at least FIG. 9B, and vice versa with quickness and ease.

Also, in an example embodiment, the first side 140A and the second side 140B include a release lever portion that includes at least one through-hole 1401 and at least one groove 140H. Through-hole 1401 is configured to receive a mechanical fastener 180 such that a portion of the release lever 130 remains securely attached to the arm 140 irrespective of whether or not the release lever 130 is activated.

The grooves 140H, on the other hand, are configured such that they are open at an upper portion of the first side 140A and an upper portion of the second side 140B. With such a configuration, the grooves 140H are structured to prevent a mechanical fastener 180, connected to the release lever 130, from moving when the release lever 130 is not activated (when a force is not applied to the release lever 130 against a force of the spring 135). In addition, by being open at the upper portion thereof, the grooves 140H are also structured to provide sufficient clearance for this same mechanical fastener 180, which is connected to the release lever 130, to lift to a predetermined height when the release lever 130 is activated (when a force is applied to the release lever 130 against a force of the spring 135). The lifting of this mechanical fastener 180 to the predetermined height enables the extendable leg 105 to transition from the first position to the second position or transition from the second position to the first position.

FIG. 5 shows an enlarged view of the handle 170 according to an example embodiment of the present invention. In an example embodiment, and as shown in FIG. 2, the handle 170 is provided with a handle cover 150 that is configured to protect the handle 170 and provide a comfortable grip. In an example embodiment, the handle cover 150 is attached to the handle 170. Therefore, as shown in FIG. 5, in an example embodiment, the handle 170 includes a handle cover connection portion 170D that includes one or more through-holes for receiving one or more mechanical fasteners 180 to connect the handle cover 150 to the handle 170. The handle cover 150 comprises any suitable material, which is durable and graspable, e.g., a high strength plastic material, such as a thermoplastic, e.g., polypropylene.

The handle cover 150 comprises a single unitary piece or a plurality of pieces. In an example embodiment, the handle cover 150 comprises at least a first part 150A and a second part 150B, which are configured to mate with each other (FIG. 2). When the first part 150A and the second 150B unite, the handle cover 150 extends over the top side of the handle 170. In addition, the handle cover 150 extends at least partially over lateral sides of the handle 170.

The handle 170 comprises a rigid material, such as a metal, an alloy, a high-strength plastic, or any composition of sufficient strength and stiffness, non-limiting examples of which include steel and aluminum. In an example embodiment, the handle 170 is a stamped sheet of a metal material. Alternatively, the handle 170 can be formed by welding together a plurality of suitable parts. Also, as shown in FIG. 5, in an example embodiment, the handle 170 includes a three-sided structural configuration such that the strength and rigidity of the structure is enhanced. In this regard, the handle 170 is structured to provide suitable connections to at least the base body 160 and the link 175.

The handle 170 is connected to the base body 160. More specifically, in an example embodiment, the handle 170 includes a base body connection portion 170A, which includes at least one through-hole that is structured to receive at least one mechanical fastener 180 that connects the handle 170 to the base body 160. This connection of the handle 170 to the base body 160 provides a pivot point via handle connection portion 160D.

In addition, as noted above, the handle 170 includes at least one groove 170B, which is structured to receive a mechanical fastener 180 that connects the arm 140 to the link 175, so that the mechanical fastener 180 does not block the handle 170 from pivoting in a direction towards the first end portion 400A of the arm 140. The at least one groove 170B is structured to provide sufficient clearance such that the handle 170 is able to be shifted into proper position so that the locking and clamping forces are generated due to the over-center lock point. In addition, as an alternative to the example embodiment discussed above in which the abutment surface 160F prevents the continued rotation of the handle 170 towards the shaft 165 to a point at which the locking and clamping forces will be released, in an example embodiment, the at least one groove 170B has a groove surface that is configured to abut against the mechanical fastener 180 (FIG. 7A) such that the handle 170 is prevented from continued rotation towards the first end portion 400A of the arm 140 due to, for example, an abutment of link 175 against the base body 160 or the shaft 165. In this regard, the prevention of the continued rotation of the handle 170 by the abutment of the groove surface against the mechanical fastener 180 ensures generation of the locking and clamping forces and prevents the handle 170 from colliding with the shaft 165, thereby preventing wear to the handle cover 150.

As noted above, the handle 170 also includes a link connection portion 170C, which, in an example embodiment, includes at least one through-hole configured to receive at least one mechanical fastener 180 that connects the handle 170 to the link 175. This connection of the handle 170 to the link 175 provides a pivot point via a second connection part 175B.

FIG. 6A shows an enlarged view of the link 175 according to an example embodiment of the present invention. The interconnection of the link 175, the handle 170, the base body 160, and the arm 140 is configured to form an over-center toggle mechanism. The link 175 is configured to provide pivot points of the over-center toggle mechanism. To do so, the link 175 includes a first connection part 175A and a second connection part 175B for pivoting of each one of the base body 160, the arm 140, and the handle 170 relative to each of the other two of those three components. In an example embodiment, the clamping apparatus 100 is configured so that after the locking and clamping forces are generated at the over-center lock point, the handle 170 is prevented, by an abutment, from continued rotation in that direction past a limiting point. For example, as shown in at least FIG. 6A, the link 175 comprises a stamped sheet of a metal material with a three-sided configuration, which includes part 175C as one of its three sides. The part 175C connects the two opposing sides of the link 175 together. The connection of the two opposite sides of the link 175 by part 175C enables the link 175 to be a unitary structure. Also, as mentioned above, according to one example embodiment, to a certain extent, the part 175C is a mechanical stop, which prevents the continued rotation of the handle 170 towards the first end portion 400A of the arm 140 by abutting against a surface of the base body 160 or the shaft 165. In this regard, for example, the part 175C is configured to prevent the handle 170 and the handle cover 150 from colliding with the shaft 165, thereby preventing wear on the handle cover 150. Although FIG. 6A illustrates an example embodiment of the link 175 with part 175C, the link 175 does not need to include part 175C, for example, in an example embodiment with a different abutment such as that discussed above where the handle 170 abuts against the abutment surface 160F.

In this regard, FIG. 6B shows an enlarged view of the link 175' according to an alternative example embodiment of the present invention. Similar to FIG. 6A, the interconnection of the link 175', the handle 170, the base body 160, and the arm 140 is configured to form an over-center toggle mechanism.

The link 175' is configured to provide pivot points of the over-center toggle mechanism. To do so, the link 175' includes a first connection part 175A' and a second connection part 175B' for pivoting of each one of the base body 160, the arm 140, and the handle 170 relative to each of the other two of those three components. However, in contrast to the link 175 shown in FIG. 6A, the link 175' of FIG. 6B does not include part 175C. Instead, as shown, the link 175' comprises two separate components with each component including lower first connection part 175A' and upper second connection part 175B', and prevention of the continued rotation of the handle 170 past the limiting point can be by abutment of other parts.

FIGS. 7A and 7B illustrate the link 175, showing the pivot points of the over-center toggle mechanism in accordance with an example embodiment of the present invention. For instance, in an example embodiment, the link 175 includes the first connection part 175A that includes at least one through-hole, which is configured to receive a mechanical fastener 180 that connects the link 175 to the link connection portion 140F of the arm 140 and that can be received within the groove 170B of the handle 170. In this manner, the groove 170B of the handle 170, the first connection part 175A of the link 175, and the link connection portion 140F of the arm 140 are operatively connected to each other.

Also, in an example embodiment, the link 175 includes the second connection part 175B that includes at least one through-hole, which is configured to receive a mechanical fastener 180 that connects the link 175 to the at least one connection point 170C of the handle 170. This secure connection of the link 175 to the handle 175 provides a pivot point of the over-center toggle mechanism. In this manner, the link and 175 and the handle 170 are operatively connected to each other.

More specifically, according to an example embodiment, the clamping apparatus 100 is configured so that after the over-center lock point is reached when rotating the upper portion of the handle 170 towards the first end of the arm 140, the handle 170 is prevented, by an abutment (such as link portion 175C), from continued rotation in that direction past a limiting point. As another example of the abutment, in an example embodiment, edge portions of the handle 170 between the base body connection portion 170A and the at least one groove 170B are configured to contact the abutment surfaces 160F of the base body 160 to provide this abutment such that the handle 170 is prevented from continued rotation. Additionally or alternatively, the handle 170 itself, another section of the link 175, or the mechanical fastener 180 that extends through the first connection part 175A provides or contributes to this abutment. By preventing the continued rotation of the handle 170, a downward clamping force 800 is applied by the arm 140 (and the extendable leg 105) onto the workpiece W. Specifically, the rotation of the handle 170 toward the first end of the arm 140 causes the base body 160 to be lifted due to the connection of handle connection portion 160D of the base body 160 to the base body connection portion 170A of the handle 170, with this lifting motion of the base body 160 being relative to the arm 140 due to the fixing of the height of the position of the link 175 relative to the arm 140 by way of the connection of first connection part 175A of link 175 to the link connection portion 140F of the arm 140. This relative upward motion of the base body 160 relative to the arm 140 actually translates into a downward motion of the arm 140, thereby providing the downward clamping force 800, which is maintained by the abutment that prevents the continued rotation of the handle 170 towards the first end of the arm 140 after the over-center lock point has been reached.

Figure 8A:
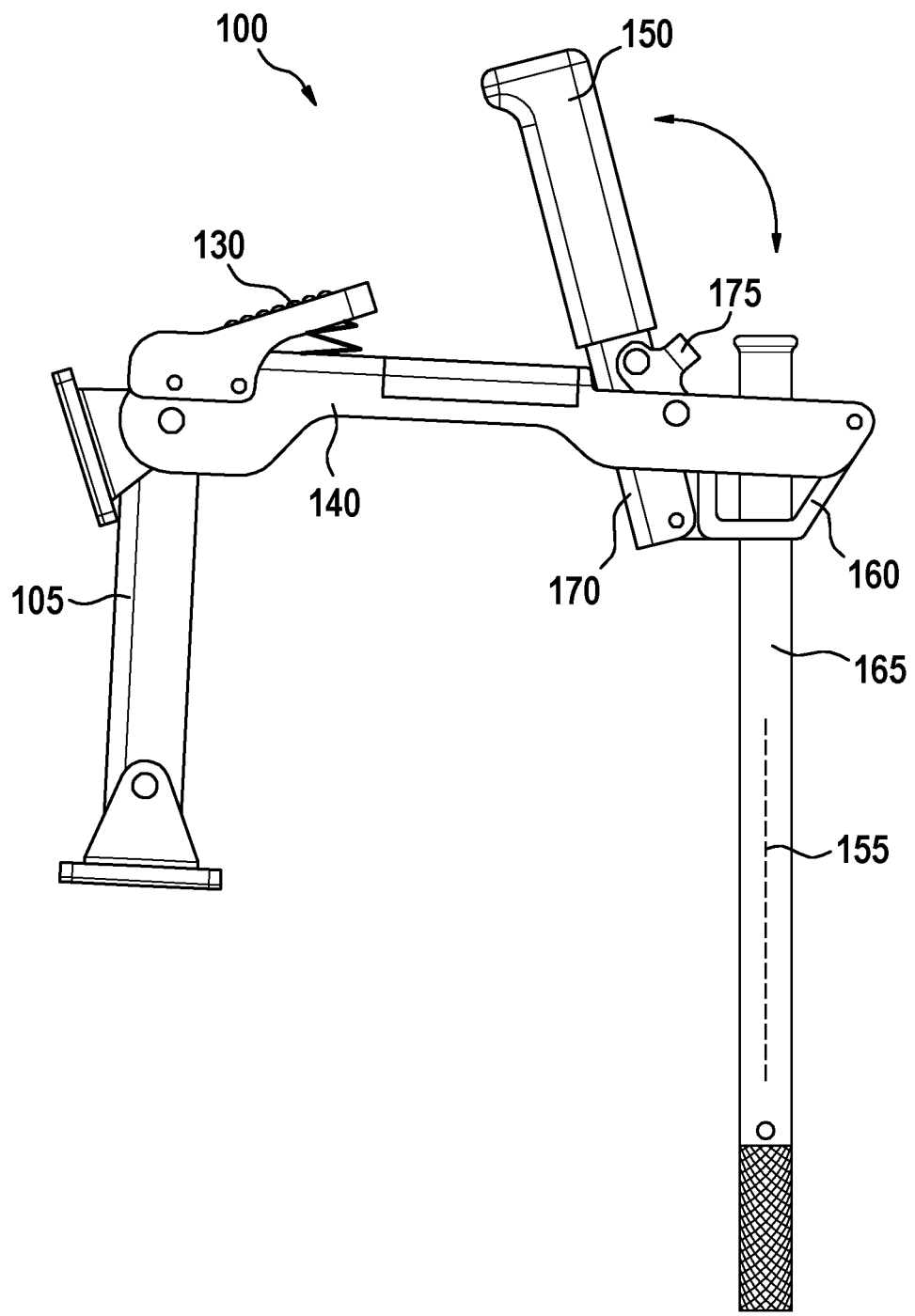
FIG. 8A is a side view of the clamping apparatus with the handle in a released position, according to an example embodiment of the present invention.

FIG. 8A shows a side view of the clamping apparatus 100 when the handle 170 is in the released position, according to an example embodiment of the present invention. The handle 170 is configured to function as a clamping lever by generating the clamping force 800 as discussed above. While in the illustrated released position, the clamping mechanism is in its toggle release state, in which the clamping force 800 is not applied by the clamping mechanism.

Figure 8B:
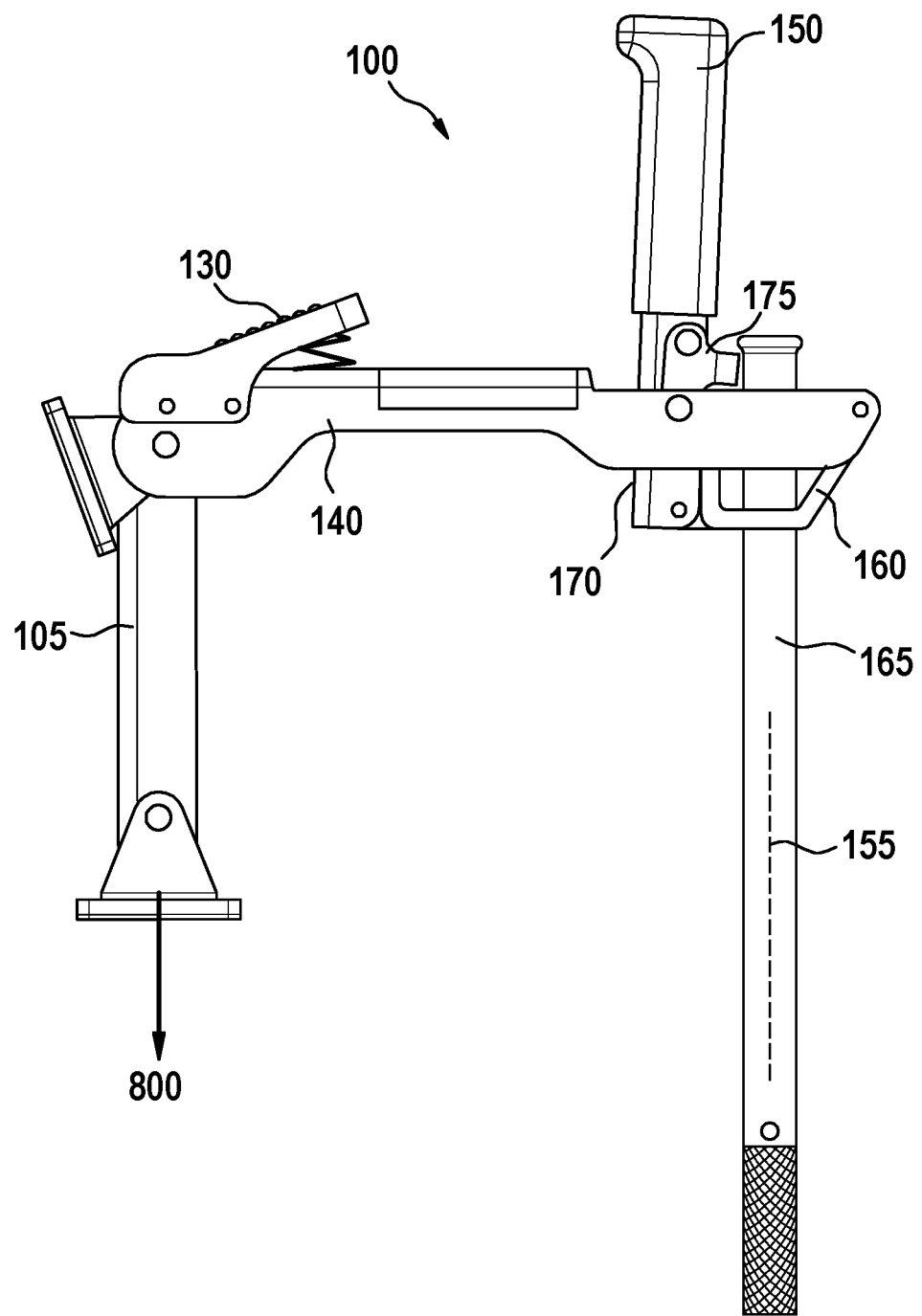
FIG. 8B is a side view of the clamping apparatus with the handle in a clamping position, according to an example embodiment of the present invention.

Additionally or alternatively, in an example embodiment, the clamping mechanism is also configured to function as a releasable locking mechanism by which to lock a position, e.g., height, of the base body 160 relative to the shaft 165, where the position is unlocked when the handle 170 is in the released position shown in FIG. 8A and is locked when the handle 170 is in the locking and clamping position shown in FIG. 8B, in which the clamping mechanism also applies the clamping force 800. The locking function is provided due to a tilting of the base body 160 relative to the shaft 165 that occurs when the base body 160 is pivoted upwards, as described above. Since the pivot connections do not cause the shaft 165 to be moved when the handle 170 is rotated, therefore the rotation of the handle 170, which causes the upward pivoting of the base body 160, thereby also causes an interior edge of the upper bore 160A facing the second end of the arm 140 to tightly butt up against the side of the shaft 165 facing the second end of the arm 140 and also causes an interior edge of the lower bore 160B facing the first end of the arm 140 to tightly butt up against the side of the shaft 165 facing the first end of the arm, under the over-center toggle force. However, when the handle 170 is in the released position shown in FIG. 7A, the base body 160 is free to be shifted along the shaft 165 to various positions or heights with relative ease while in this toggle release state.

FIG. 8B shows a side view of the clamping apparatus 100 when the handle 170 is in the clamping position, according to an example embodiment of the present invention. While in this clamping position and/or locking position, the clamping mechanism is configured to provide a downward clamping force 800 when engaged with a surface of an object, such as workpiece W. The downward clamping force 800 is configured to hold the workpiece W in a fixed position. As discussed above, the clamping mechanism is configured to provide a clamping force 800 onto a workpiece W by moving the handle 170 from its released position, as shown in FIG. 8A, to its locking position, as shown in FIG. 8B. Additionally or alternatively, in at least the example embodiment in which the base body 160 moves along the shaft 165, the clamping mechanism is also configured to hold or lock the base body 160 in its current position and height while in this toggle position. (A different locking mechanism can be provided for the embodiment in the length of the shaft 165 is variable by a telescoping action.)

In an example embodiment, the clamping mechanism further includes an extendable leg 105 that comprises a rigid material, such as a metal, an alloy, a high-strength plastic, or any composition with sufficient strength and stiffness, non-limiting examples of which include steel and aluminum. In an example embodiment, the extendable leg 105 comprises a stamped sheet of a metal material with a three-sided structural configuration, for example with a U-shaped or C-shaped cross-section.

In an example embodiment, the extendable leg 105 is configured to support a clamping foot 110 at a first end portion 105C and a clamping foot 120 at a second end portion 105D. In an example embodiment, the first end portion 105C of the extendable leg 105 includes at least one through-hole, which is configured to receive a mechanical fastener 180 to enable the clamping foot 110 to pivot or swivel with respect to the extendable leg 105. In an example embodiment, the second end portion 105D includes at least one through-hole, which is configured to receive a mechanical fastener 180 to enable the clamping foot 120 to pivot or swivel with respect to the extendable leg 105. Alternatively, in another example embodiment, the clamping foot 120 is not included on the extendable leg 105 or is fixed to the extendable leg 105.

In an example embodiment, the clamping foot 110 is configured to provide a clamping surface for the workpiece W. To do so, in an example embodiment, the clamping foot 110 comprises a rigid material, such as a metal, an alloy, a high-strength plastic, or any composition with sufficient strength and stiffness, non-limiting examples of which include steel and aluminum.

In an example embodiment, the clamping foot 110 includes a protective covering 125 over at least a portion of the clamping surface of the clamping foot 110. The protective covering 115 comprises any suitable material for protecting the workpiece W from a clamping force 800 and preventing the clamping foot 110 from marring the workpiece W. In addition, the protective covering 115 is configured to provide traction to prevent the clamping foot 110 from moving relative to the workpiece W. For example, the protective covering 115 comprises an elastomeric material, such as rubber.

In an example embodiment, the protective covering 125 is attached to the clamping foot 110 by fitting over tab 110A or tab-like portions 110A of the clamping foot 110 (FIG. 2). With such a configuration, the protective covering 125 is configured to detach from the clamping foot 110, if desired. Additionally or alternatively, the protective covering 125 is fixed to the clamping foot 110 by an adhesive.

In an example embodiment, the clamping foot 120 is configured to provide a clamping surface for the workpiece W. To do so, in an example embodiment, the clamping foot 120 comprises a rigid material, such as a metal, an alloy, a high-strength plastic, or any composition with sufficient strength and stiffness, non-limiting examples of which include steel and aluminum.

In an example embodiment, the clamping foot 120 includes a protective covering 125 over at least a portion of the clamping surface of the clamping foot 120. The protective covering 125 comprises any suitable material for protecting the workpiece W from a clamping force 800 and preventing the clamping foot 120 from marring the workpiece W. In addition, the protective covering 125 is configured to provide traction to prevent the clamping foot 120 from moving relative to the workpiece W. For example, the protective covering 125 comprises an elastomeric material, such as rubber.

In an example embodiment, the protective covering 125 is attached to the clamping foot 120 by fitting over tab 120A or tab-like portions 120A of the clamping foot 120 (FIG. 2). With such a configuration, the protective covering 125 is configured to detach from the clamping foot 120, if desired. Additionally or alternatively, the protective covering 125 is fixed to the clamping foot 120 by an adhesive.

In an example embodiment, the extendable leg 105 includes a first set of grooves 105A and a second set of grooves 105B, as shown in FIG. 2. A mechanical fastener 180 that is attached to the left through-hole of release lever 130 shown in FIG. 2, and which is positioned within grooves 140H of the arm 140 when the release lever 130 is in its non-actuated position, is selectively positioned within either the first set of grooves 105A of the extendable leg 105 or the second set of grooves 105B of the extendable leg 105, depending on whether the extendable leg 105 is in its first position or its second position. The first set of grooves 105A is spaced apart from the second set of grooves 105B along the extendable leg 105.

With such a configuration, the first set of grooves 105A and the second set of grooves 105B are structured to prevent a movement of the extendable leg 105 when the release lever 130 is not activated, by receipt of the mechanical fastener 180 in either the first set of grooves 105A or the second set of grooves 105B. The first set of grooves 105A is therefore configured to hold the extendable leg 105 in the first position when the release lever 130 is not activated. However, when the release lever 130 is activated, the first set of grooves 105A are structured for the mechanical fastener 180 to be lifted out of the first set of grooves 105A with sufficient clearance to allow rotation of the extendable leg 105 without walls of the grooves 105A interfering with a movement of the mechanical fastener 180. As such, the mechanical fastener 180 is able to transition either into or out of the first set of grooves 105A upon activation of the release lever 130 with relative ease and quickness.

Similarly, the second set of grooves 105B are structured to prevent a movement of the extendable leg 105 when the release lever 130 is not activated. The second set of grooves 105B is therefore configured to hold the extendable leg 105 in the second position. However, when the release lever 130 is activated, the second set of grooves 105B are structured for the mechanical fastener 180 to be lifted out of the grooves 105B with sufficient clearance to allow rotation of the extendable leg 105 without walls of the grooves 105B interfering with a movement of the mechanical fastener 180. As such, the mechanical fastener 180 is able to transition either into or out of the second set of grooves 105B upon activation of the release lever 130 with relative ease and quickness.

Figure 9A:
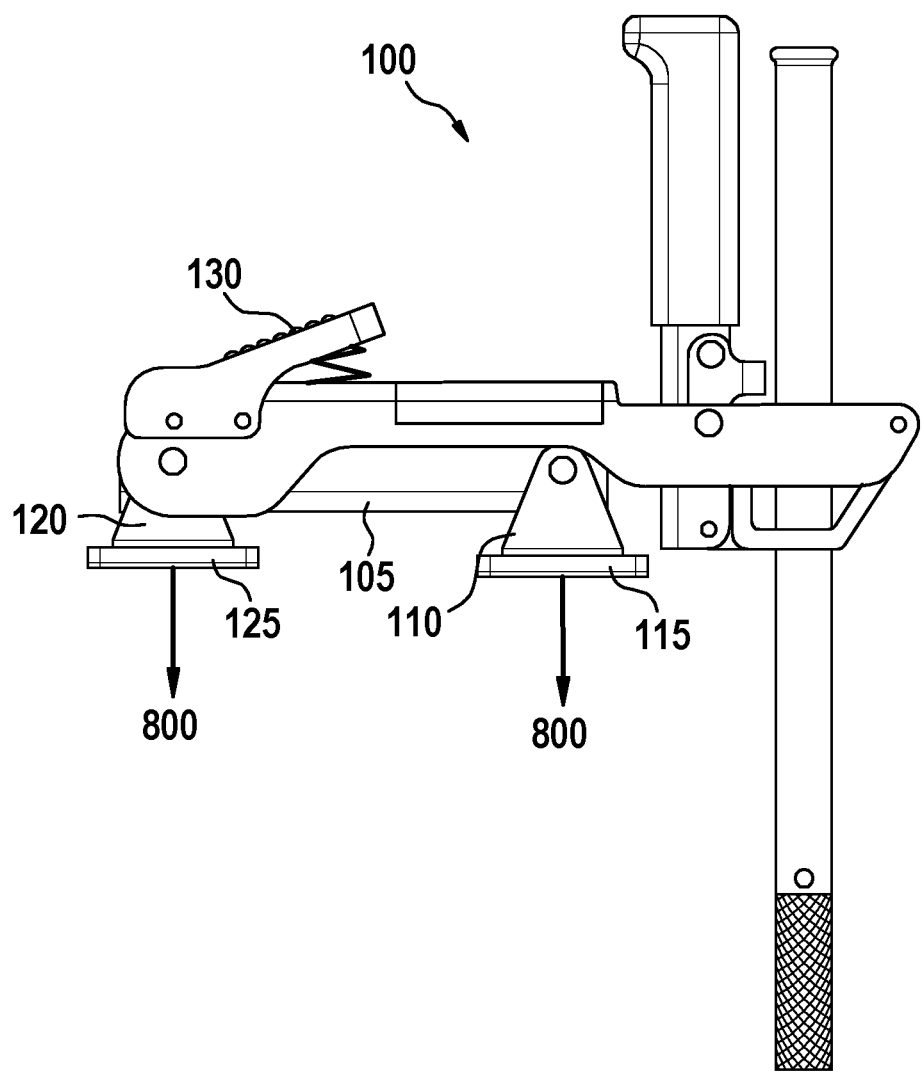
FIG. 9A is a side view of the clamping apparatus with an extendable leg shown in FIG. 2 in a first position, according to an example embodiment of the present invention.

FIG. 9A shows a side view of the clamping apparatus 100 with the extendable leg 105 in its first position according to an example embodiment of the present invention. As shown, this first position is particularly beneficial in providing a clamping force 800 to a workpiece W that is relatively thick, tall, or both thick and tall. This first position is also beneficial in providing the user with the option of using clamping foot 110, clamping foot 120, or both clamping feet 110 and 120. To do so, the extendable leg 105 is configured to be rotated into a position in which it extends in a direction that is parallel or substantially parallel to an extension direction of the arm 140. When in this first position, the extendable leg 105 is configured to be received and stored within the three-sided structural configuration of the arm 140. In this first position, the clamping apparatus 100 is configured to provide a clamping force 800 to a workpiece W via clamping foot 110, clamping foot 120, or both clamping feet 110 and 120.

Figure 9B:
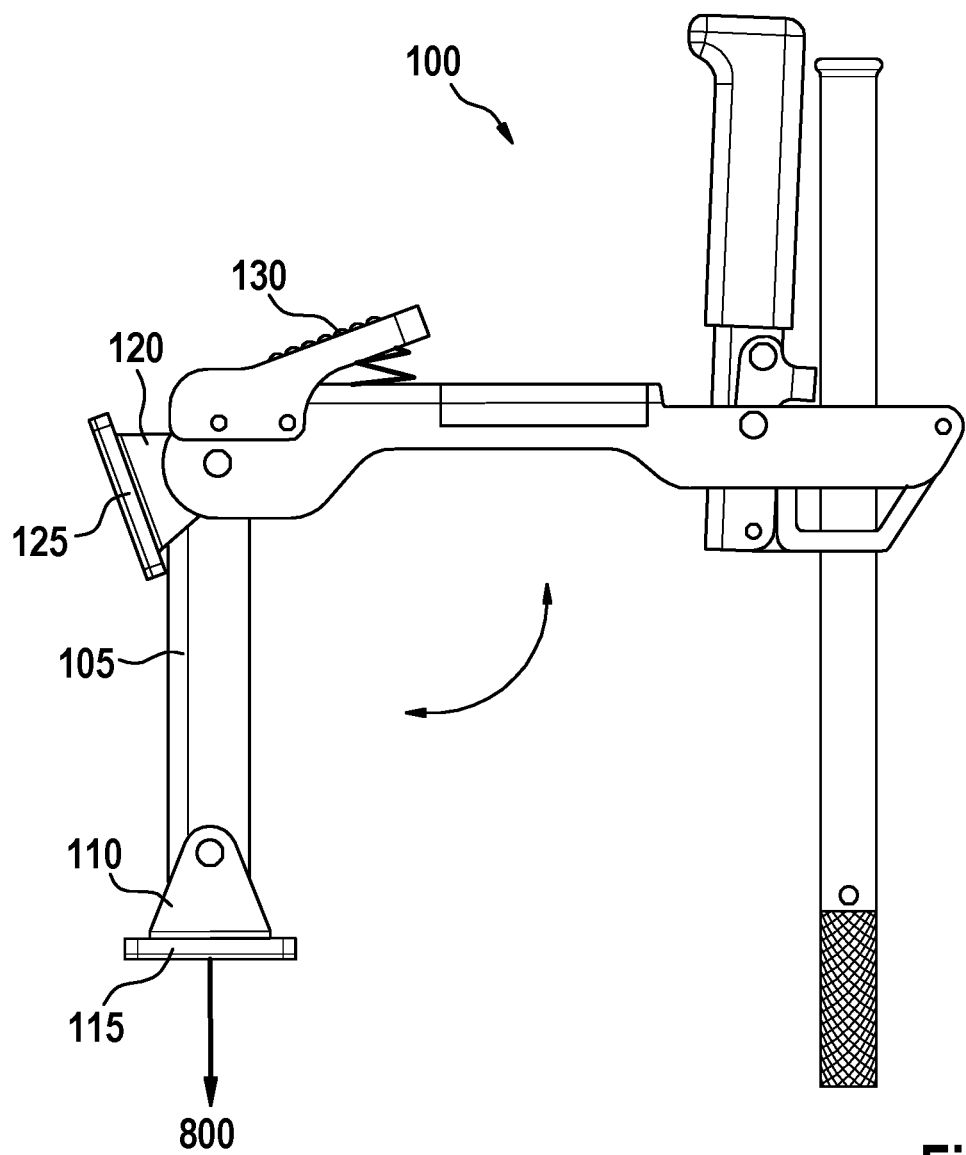
FIG. 9B is a side view of the clamping apparatus with the extendable leg shown in FIG. 2 in a second position, according to an example embodiment of the present invention.

FIG. 9B shows a side view of the clamping apparatus 100 with the extendable leg 105 in its second position according to an example embodiment of the present invention. As shown, this second position is particularly beneficial in providing a clamping force 800 to a workpiece W that is relatively thin, short, or both thin and short. To do so, the extendable leg 105 is configured to be rotated into a position in which it extends in a direction that is substantially perpendicular to an extension direction of the arm 140. In this second position, the clamping apparatus 100 is configured to provide a clamping force 800 to a workpiece W via clamping foot 110 (but not clamping foot 120).

As described above, the clamping apparatus 100 quickly and easily transitions from the first position, as shown in FIG. 9A, to the second position, as shown in FIG. 9B. The clamping apparatus 100 also quickly and easily transitions from the second position, as shown in FIG. 9B, to the first position, as shown in FIG. 9A. These transitions are able to be performed upon activating the release lever 130 and engaging the extendable leg 105 in a pivoting motion, as indicated in FIGS. 9A and 9B.

As discussed above, the release lever 130 is configured to be actuated into a position that enables the extendable leg 105 to engage in a pivotal motion between its first position and its second position. However, the clamping apparatus 100 is not limited to providing this functionality using the release lever 130. Rather, the clamping apparatus 100 can include other mechanical mechanisms that enable the extendable leg 105 to pivot and lock into the first position and the second position. To further illustrate this point, other non-limiting example embodiments are discussed below.

Figure 10A:
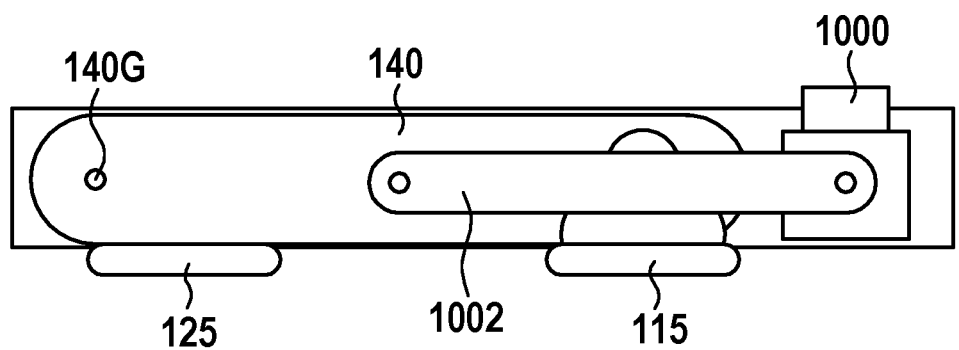
FIG. 10A is a side view of a section of the clamping apparatus according to an alternative example embodiment of the present invention, with a pinch-lock type mechanism positioning the extendable leg in the first position.
Figure 10B:
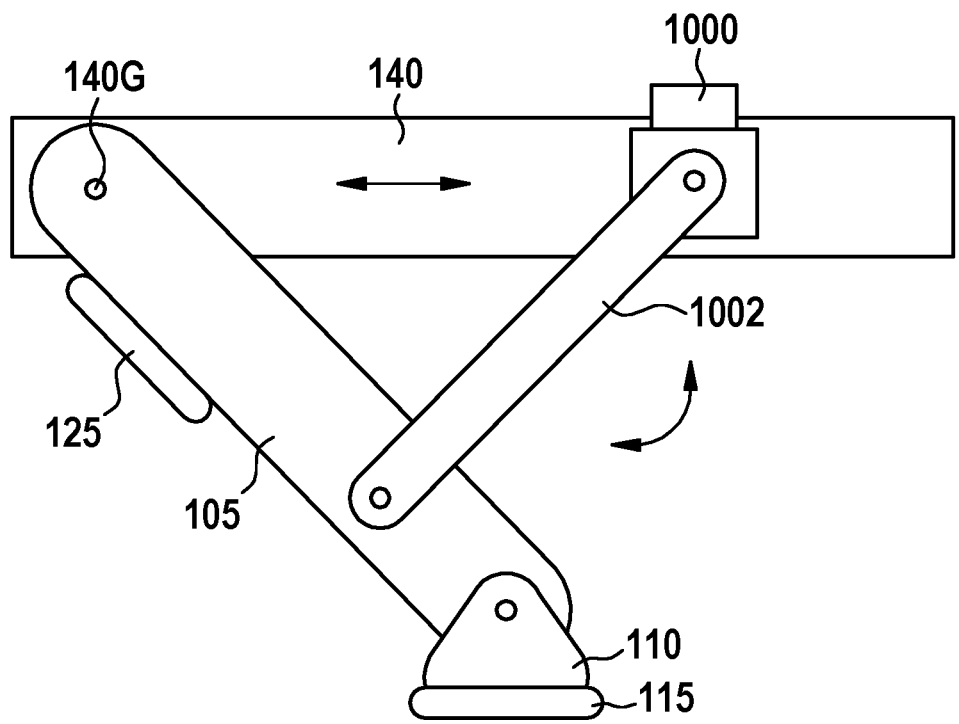
FIG. 10B is a side view of a section of the clamping apparatus according to the alternative example embodiment of the present invention, with the pinch-lock type mechanism positioning the extendable leg in an intermediary position.
Figure 10C:
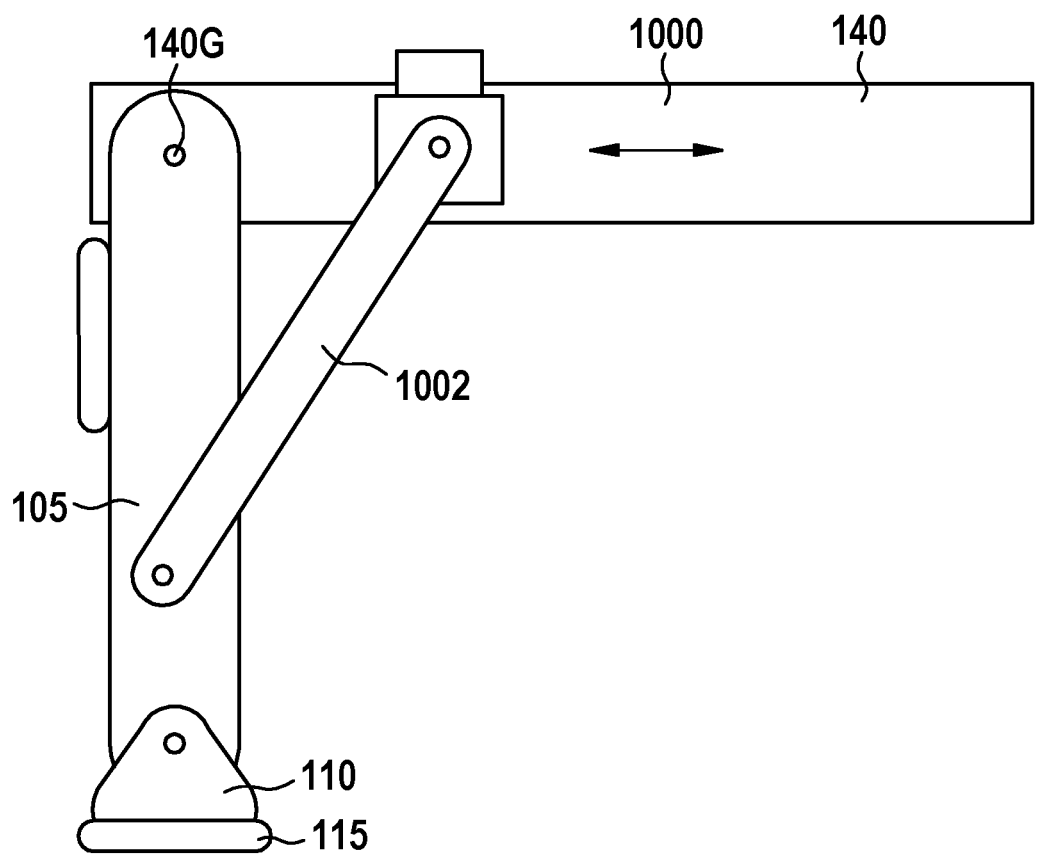
FIG. 10C is a side view of a section of the clamping apparatus according to the alternative example embodiment of the present invention, with the pinch-lock type mechanism positioning the extendable leg in the second position.
Figure 10F:
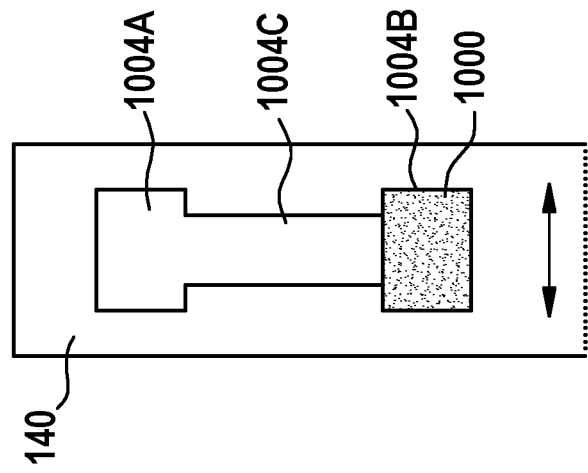
FIG. 10F is a plan view of a section of the pinch-lock type mechanism when the extendable leg is in the second position, according to an example embodiment of the present invention.
Figure 10E:
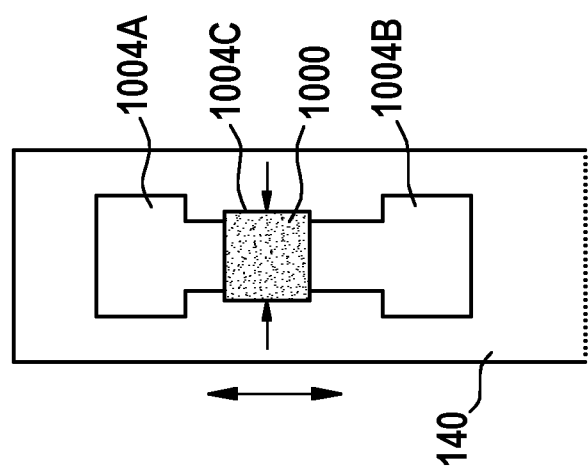
FIG. 10E is a plan view of a section of the pinch-lock type mechanism when the extendable leg is in a sliding and transitional position, according to an example embodiment of the present invention.
Figure 10D:
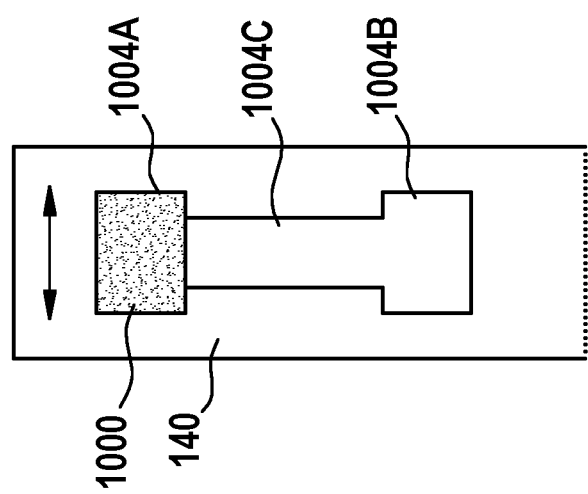
FIG. 10D is a plan view of a section of the pinch-lock type mechanism when the extendable leg is in the first position, according to an example embodiment of the present invention.

FIGS. 10A-10F illustrate the inclusion of a pinch-lock type mechanism 1000 in the clamping apparatus 100. The pinch-lock type mechanism 1000 enables the extendable leg 105 to be pivoted and locked into its first and second positions, respectively. More specifically, each of FIGS. 10A-10C illustrates a side view of a section of the arm 140 of the clamping apparatus 100 while each of FIGS. 10D-10F illustrates a top plan view of a section of the arm 140 of the clamping apparatus 100.

In this example embodiment, the pinch-lock type mechanism 1000 is configured to move within a slot of the arm 140. In such a case, according to an example embodiment, the slot is composed of a first slot portion 1004A, a second slot portion 1004B, and a transitional slot portion 1004C. The pinch-lock type mechanism 1000 is configured to move to any position within the slot. To move, the pinch-lock type mechanism 1000 has opposite sides that are configured to be pinched-in perpendicular to a direction of movement along the slot, such that at least one of its dimensions, e.g., its width, is able to be reduced. With a reduced dimension, the pinch-lock type mechanism 1000 is configured to move along the arm 140 to any position within the slot 1004.

As shown in FIGS. 10D-10F, the slot includes at least the first slot portion 1004A, the second slot portion 1004B, and the transitional slot portion 1004C. A width of the first slot portion 1004A is greater than that of the transitional slot portion 1004C. Also, a width of the second slot portion 1004B is greater than that of the transitional slot portion 1004C. With the greater dimension, each of the first slot portion 1004A and the second slot portion 1004B is able to provide sufficient width such that the pinch-lock type mechanism 1000 is able to expand to its normal width upon being in its non-pinched state, i.e., upon being released from its pinched-in state. That is, when the pinch-lock type mechanism 1000 is not pinched-in, then the pinch-lock mechanism 1000 maintains its normal width dimension, which is wider than the transitional slot portion 1004C. As such, when in its non-pinched-in state, the sides of the pinch-lock type mechanism 1000 abut against parts of the arm 140 such that the pinch-lock type mechanism 1000 is unable to move within the slot, thereby locking the pinch-lock type mechanism 1000 in the first position, as illustrated in FIGS. 10A and 10D, or into the second position, as illustrated in FIGS. 10C and 10F. FIG. 10B shows the pinch-lock type mechanism 1000 and the extendable leg 105 in an intermediary position, while the pinch-lock type mechanism 1000 is in the position shown in FIG. 10E.

When the pinch-lock mechanism 1000 is in the first slot portion 1004A, the pinch-lock mechanism 1000 and its link 1002 are locked in the first position such that the extendable leg 105 is received and housed within the arm 140, as shown in FIG. 10A. On the other hand, when the pinch-lock mechanism 1000 is in the second slot portion 1004B, the pinch-lock mechanism 1000 and its link 1002 are locked in the second position such that the extendable leg 105 extends away from and approximately perpendicular to the arm 140, as shown in FIG. 10C. As discussed above, the extendable leg 105 is able to transition from the first position to the second position and vice versa by a simple pinching and sliding action of the pinch-lock type mechanism 1000.

Figure 11A:
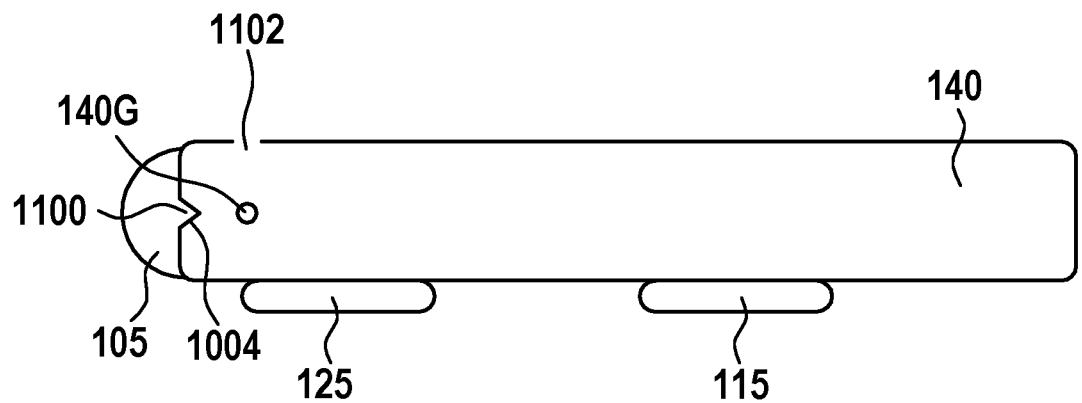
FIG. 11A is a side view of a section of the clamping apparatus, according to yet another alternative example embodiment, with a detent-lock type mechanism being shown locking the extendable leg in the first position.
Figure 11B:
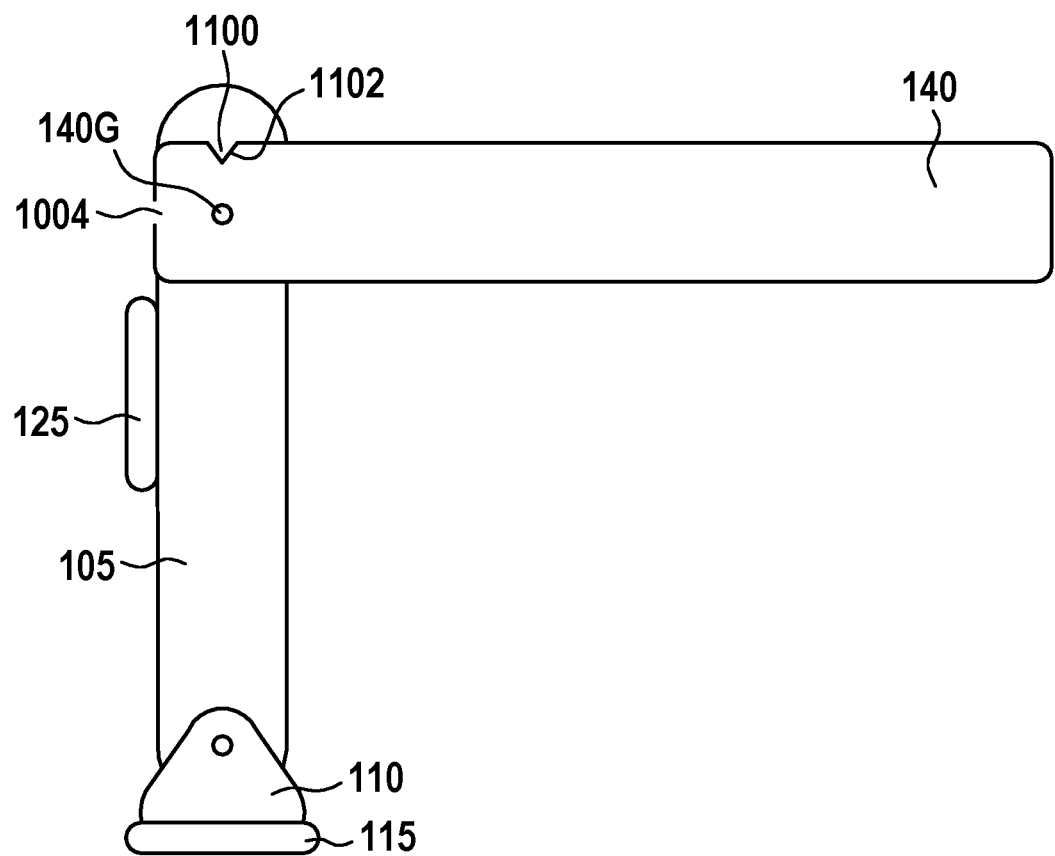
FIG. 11B is a side view of a section of the clamping apparatus with the detent-lock type mechanism being shown locking the extendable leg in the second position, according to an example embodiment of the present invention.

FIGS. 11A and 11B illustrate the clamping apparatus 100 with yet a different kind of mechanism for transitioning the extendable leg 105 between its two positions, according to another example embodiment of the present invention. More specifically, in this embodiment, the clamping apparatus 100 includes a detent-lock mechanism to enable the extendable leg 105 to pivot and lock into the first and second positions, respectively. In an example embodiment, the detent-lock mechanism includes a detent 1100 on the extendable leg 105. The detent-lock mechanism also includes grooves 1102 and 1104 on the arm 140. In an example embodiment, the arm 140 and the extendable leg 105 can be pivoted relative to each other about the pivot connection portion 140G such that the detent 1100 of the extendable leg 105 is able to move and lock into the first position by engagement of the detent 1100 with the groove 1104, as shown in FIG. 11A, and also move and lock into the second position by engagement of the detent 1100 with the groove 1102, as shown in FIG. 11B. For example the detent 1100 may be spring loaded in a direction toward the interior of arm 140 and therefore positioned into the groove 1102 or the groove 1104, but, with sufficient force, can be lifted out of the groove 1102 or the groove 1104.

As previously mentioned, the advantages of the clamping apparatus 100 may be experienced with another apparatus, such as the saw apparatus 200 as shown in FIGS. 12A-14B. As shown, the saw apparatus 200 includes a number of components, such as a base, a turntable, a guide fence, a bevel post, rails, a yoke, a saw-head unit, a motor, a cutting blade, and the like. The saw apparatus 200 can also include other components, which have not been specifically mentioned.

Figure 12A:
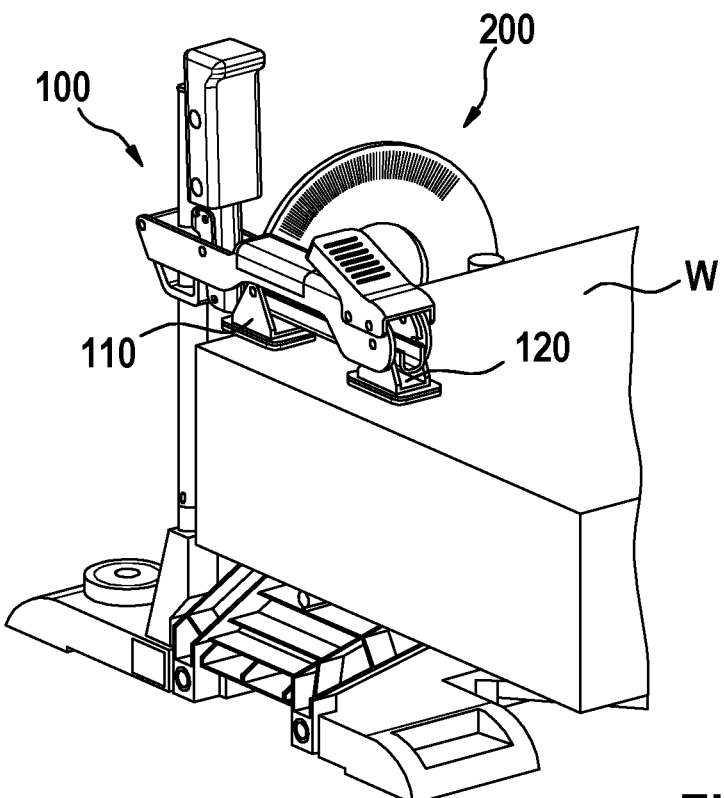
FIG. 12A is a perspective view of the clamping apparatus, shown in combination with a power tool and with the extendable leg in the first position, according to an example embodiment of the present invention.
Figure 12B:
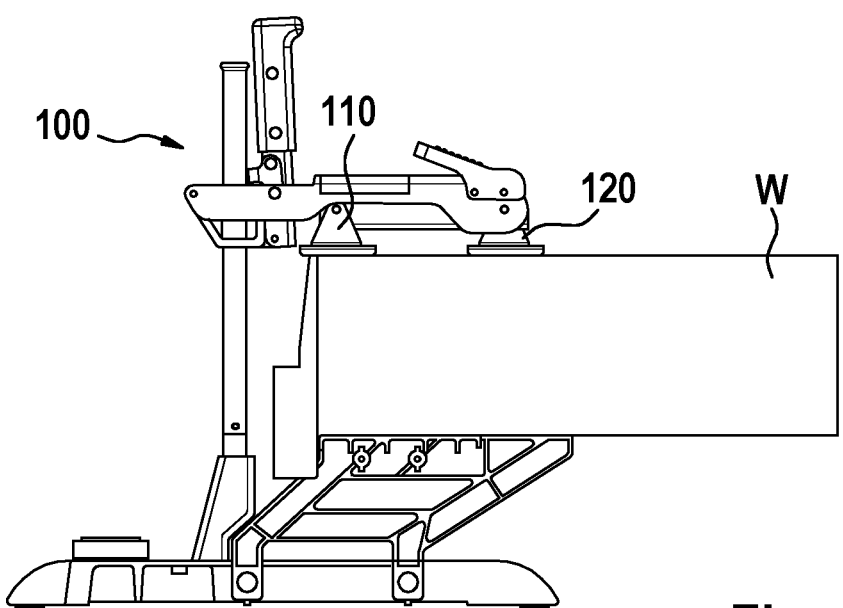
FIG. 12B is a side view, corresponding to the perspective view of FIG. 12A, of the clamping apparatus, shown in combination with a power tool and with the extendable leg in the first position, according to an example embodiment of the present invention.

FIGS. 12A and 12B show the clamping apparatus 100 with the extendable leg 105 in the first position, according to an example embodiment of the present invention. These non-limiting illustrations depict the clamping apparatus 100 in connection with the saw apparatus 200. In addition, these illustrations depict the clamping apparatus 100 while a clamping force 800 is being applied to the workpiece W via clamping foot 110 and clamping foot 120.

Figure 13A:
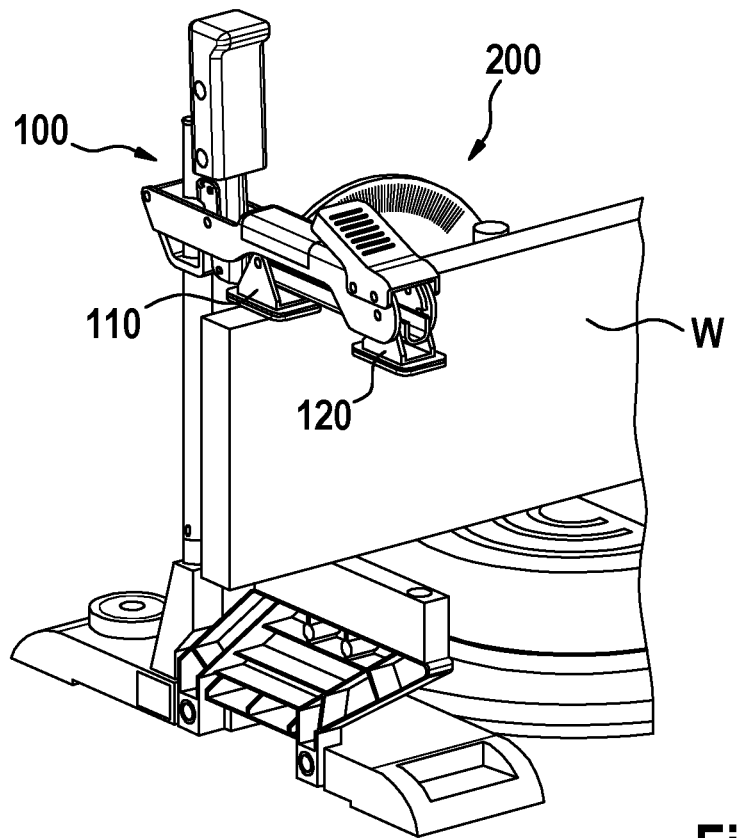
FIG. 13A is another perspective view of the clamping apparatus, shown in combination with a power tool and with the extendable leg in the first position, according to an example embodiment of the present invention.
Figure 13B:
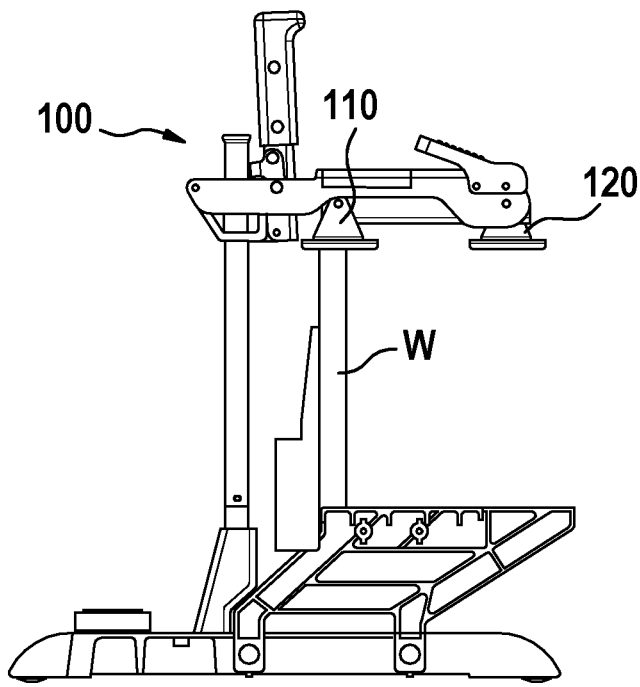
FIG. 13B is a side view, corresponding to the perspective view of FIG. 13A, of the clamping apparatus, shown in combination with a power tool and with the extendable leg in the first position, according to an example embodiment of the present invention.

FIGS. 13A and 13B show the clamping apparatus 100 with the extendable leg 105 in the first position, according to an example embodiment of the present invention. These non-limiting illustrations depict the clamping apparatus 100 in connection with the saw apparatus 200. In addition, these illustrations depict the clamping apparatus 100 while a clamping force 800 is being applied to the workpiece W via clamping foot 110 and not clamping foot 120. Alternatively, although not shown, this same workpiece W may be placed under clamping foot 120 instead of clamping foot 110 such that the clamping force 800 is applied to the workpiece W via clamping foot 120.

Figure 14A:
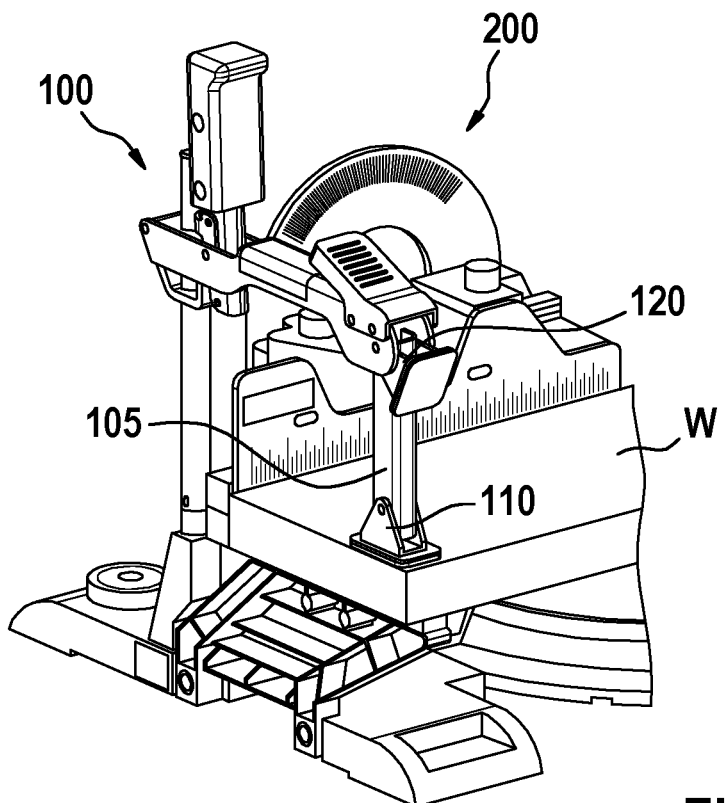
FIG. 14A is a perspective view of the clamping apparatus, shown in combination with a power tool and with the extendable leg in the second position, according to an example embodiment of the present invention.
Figure 14B:
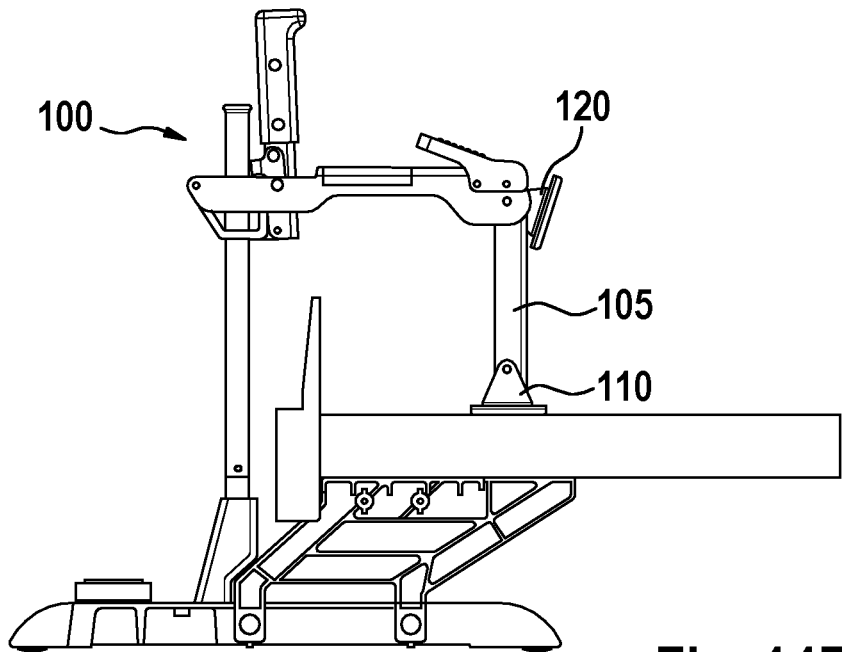
FIG. 14B is a side view, corresponding to the perspective view of FIG. 14A, of the clamping apparatus, shown in combination with a power tool and with the extendable leg in the second position, according to an example embodiment of the present invention.

FIGS. 14A and 14B show the clamping apparatus 100 with the extendable leg 105 in the second position, according to an example embodiment of the present invention. These non-limiting illustrations depict the clamping apparatus 100 in connection with the saw apparatus 200. In addition, these illustrations depict the clamping apparatus 100 while a clamping force 800 is being applied to the workpiece W via clamping foot 110.

As discussed above, the clamping apparatus 100 provides a number of benefits and advantages. For example, the clamping apparatus 100 is configured expedite the time taken to clamp a workpiece W to a power tool, such as a miter saw, for safe operation. The clamping apparatus 100 also allows the user to operate the clamping mechanism with one hand, for example, by a simple movement of the handle 170, thereby freeing the user's other hand to position the workpiece W for accurate cuts.

In addition, the clamping apparatus 100 is configured to provide a toggle mechanism that locks the base body 160 to the desired height along a shaft 165 while simultaneously enabling a clamping force 800 to be applied to the workpiece W. That is, the height adjustment and the clamping action can be set by simply moving the handle 170 from the released position to the locking position. Furthermore, the ease with which the clamping force 800 is able to be removed and/or applied by a simple movement of the handle 170 allows for rapid adjustment of the clamping mechanism.

Furthermore, as described herein, the clamping apparatus 100 is configured to accommodate workpieces W of different sizes, shapes, and thicknesses. The clamping apparatus 100 is configured to provide more than one type of adjustment mechanism for adjusting the clamping mechanism to different workpieces W. For example, the clamping mechanism is configured to provide for a sliding adjustment of the arm 140 to set the clamping mechanism at a desired height with relative ease and quickness. Additionally, the clamping mechanism is configured to provide for a pivotal adjustment of the extendable leg 105 into a folded position (e.g., a first clamping position) or an extended position (e.g., a second clamping position) with relative ease and quickness.

These features of the clamping apparatus 100 are in direct contrast to a clamp with a lead screw type mechanism, which require adjustments that are both time consuming and cumbersome. The benefits of the clamping apparatus are particularly pronounced in situations in which there is a great disparity in size (e.g., height or thickness) between two workpieces W that are to be clamped in sequence.

The clamping apparatus 100 can be used together with a saw apparatus 200. Also, in such a case, when the clamping apparatus 100 is not in use, then the clamping mechanism can be positioned behind a fence of the saw apparatus 200 with ease, if desired. In this regard, the fence of the saw apparatus 200 would provide the necessary containment for the clamping mechanism.

The embodiments described above, which have been shown and described by way of example, and many of their advantages will be understood by the foregoing description, and it will be apparent that various changes can be made in the form, construction and arrangement of the components without departing from the disclosed subject matter or without sacrificing one or more of its advantages. Indeed, the described forms of these embodiments are merely explanatory, these embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

That is, the above description is intended to be illustrative, and not restrictive, and is provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not be limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A clamping apparatus comprising:
a shaft;
a base body that is adjustable to different positions along the shaft;
a clamping leg arranged to pivot into a first damping position and a second clamping position;
an arm that includes, and extends between, a first end portion connected to the base body and a second end portion connected to the clamping leg; and
a handle pivotally connected to the base body, the handle being movable between a first position and a second position;
wherein:
when the handle is in the first position, the handle is configured to lock a position of the base body relative to the shaft and provide a clamping force to the clamping leg;
when the handle is in the second position, the base body is freely slidable along the shaft;
the clamping leg is configured to (a) extend in a first direction when in the first clamping position and (b) extend in a second direction when in the second clamping position; and
the first direction is perpendicular to the second direction.

2. The clamping apparatus of claim 1, wherein the clamping leg is configured to be alternatively locked into each of the first and second clamping positions.

3. The clamping apparatus of claim 1, further comprising:
a first clamping foot connected to the clamping leg; and
a second clamping foot connected to the clamping leg, the second clamping foot being spaced apart from the first clamping foot along the clamping leg.

4. The clamping apparatus of claim 1, wherein the base body is configured to slide along a non-threaded portion of the shaft.

5. The clamping apparatus of claim 1, wherein the clamping apparatus is arranged for the clamping force to be released when the handle is shifted from the first position into the second position.

6. The clamping apparatus of claim 1, wherein the handle is a part of an over-center toggle mechanism by which the handle is at an over-center lock point when the handle is in the first position.

7. The damping apparatus of claim 1, wherein the base body includes an abutment surface that prevents the handle from rotating beyond an over-center lock point.

8. The clamping apparatus of claim 1, wherein the arm is structured to receive and house the clamping leg when the clamping leg is in the first position.

9. The clamping apparatus of claim 1, further comprising a link providing a pivot point at the handle and another pivot point at the arm, wherein the link is configured to move in connection with the handle relative to the arm.

10. A clamping apparatus comprising:
a shaft;
a base body that is adjustable to different positions along the shaft;
a clamping leg configured to pivot into a first clamping position and a second clamping position; and
a handle pivotally connected to the base body, the handle being movable (a) into a first position that locks the position of the base body relative to the shaft and provides a clamping force to the clamping leg, and (b) into a second position in which the base body is free to be shifted into the different positions along the shaft, wherein
the clamping leg is configured to extend in a first direction when in the first clamping position and extend in a second direction when in the second clamping position,
the first direction is perpendicular to the second direction, and
the handle is prevented from rotating beyond an over-center lock point by an abutment surface of the base body.

11. The clamping apparatus of claim 10, further comprising:
an arm that includes, and extends between, a first end portion proximal to the base body and a second end portion connected to the clamping leg.

12. The clamping apparatus of claim 10, wherein the handle is a part of an over-center-toggle mechanism by which the handle is at the over-center lock point when the handle is in the first position.

13. The clamping apparatus of claim 10, wherein the clamping leg is configured to be alternatively locked into each, of the first and second clamping positions.

14. The clamping apparatus of claim 10, further comprising:
a first clamping foot connected to the clamping leg; and
a second clamping foot connected to the clamping leg, the second clamping foot being spaced apart from the first clamping foot along the clamping leg.

15. A power tool apparatus comprising:
a power tool; and
a clamping apparatus including:
a shaft;
a base body that is adjustable to different positions along the shaft;
a clamping leg arranged to pivot into a first clamping position and a second clamping position;
an arm that includes, and extends between, a first end portion connected to the base body and a second end portion connected to the clamping leg; and
a handle pivotally connected to the base body, the handle being movable between a first position and a second position;
wherein:
when the handle is in the first position, the handle is configured to lock a position of the base body relative to the shaft and provide a clamping force to the clamping leg;
when the handle is in the second position, the base body is freely slidable along the shaft;
the clamping leg is configured to extend in (a) a first direction when in the first clamping position and (b) a second direction when in the second clamping position; and
the first direction is perpendicular to the second direction.

16. The power tool apparatus of claim 15, wherein the power tool is a saw.

17. The power tool apparatus of claim 15, wherein the clamping leg is configured to be alternatively locked into each of the first and second clamping positions.

18. The power tool apparatus of claim 15, wherein the clamping apparatus further comprises:
a first clamping foot connected to the clamping leg; and
a second clamping foot connected to the clamping leg, the second clamping foot being spaced apart from the first clamping foot along the clamping leg.

19. The power tool apparatus of claim 15, wherein:
the clamping apparatus is arranged for the clamping force to be released when the handle is shifted from the first position into the second position.

20. The power tool apparatus of claim 15, wherein the handle is a part of an over-center toggle mechanism by which the handle is at an over-center lock point when the handle is in the first position.

21. The power tool apparatus of claim 15, wherein the base body includes an abutment surface that prevents the handle from rotating beyond an over-center lock point.

* * * * *